United States Patent [19]
Ohsawa

[11] Patent Number: 5,091,967
[45] Date of Patent: Feb. 25, 1992

[54] METHOD OF EXTRACTING CONTOUR OF A SUBJECT IMAGE FROM AN ORIGINAL

[75] Inventor: Ikuo Ohsawa, Kyoto, Japan
[73] Assignee: Dainippon Screen Mfg. Co., Ltd., Japan
[21] Appl. No.: 335,866
[22] Filed: Apr. 10, 1989
[30] Foreign Application Priority Data Apr. 8, 1988 [JP] Japan .................................. 63-87929
Jul. 29, 1988 [JP] Japan .................................. 63-191428

[51] Int. Cl.⁵ .............................................. G06K 9/46
[52] U.S. Cl. ................................... 382/22; 382/33;
382/50; 382/51; 358/458; 358/96
[58] Field of Search ...................... 382/22, 23, 26, 50,
382/51, 55, 33; 358/96, 458, 464, 465, 466

[56] References Cited
U.S. PATENT DOCUMENTS 4,797,943 1/1989 Murayama et al. .................. 358/458
4,868,884 9/1989 Miyazaki et al. ..................... 382/22
4,884,224 11/1989 Hirosawa .............................. 382/22

FOREIGN PATENT DOCUMENTS 0058028A 1/1982 European Pat. Off. .

OTHER PUBLICATIONS

"Study of Many-Sided Image Processings and Software Systems for the Same", Hideyuki Tamura, *Reports of Research in Electro Technical Laboratory*, vol. 835, Chapter 3, pp. 25-64, 1984, Japan.
IBM Technical Disclosure Bulletin, vol. 14, No. 4, Sep. 1971, pp. 1302-1304.

*Primary Examiner*—David K. Moore
*Assistant Examiner*—Yon Jung
*Attorney, Agent, or Firm*—Ostrolenk, Faber, Gerb & Soffen

[57] ABSTRACT

An image window (N) is intermittently moved along the contour (CT) of a subject image (I). At a respective paused position of the image window, a spacial differential of the density level is calculated for each pixel in the image window. A differential histogram is produced from the respective differentials, and a threshold level (Eth) is determined from the differential histogram and a designated percentile ratio. A contour image is then obtained by discriminating the respective differentials with the threshold level.

24 Claims, 14 Drawing Sheets

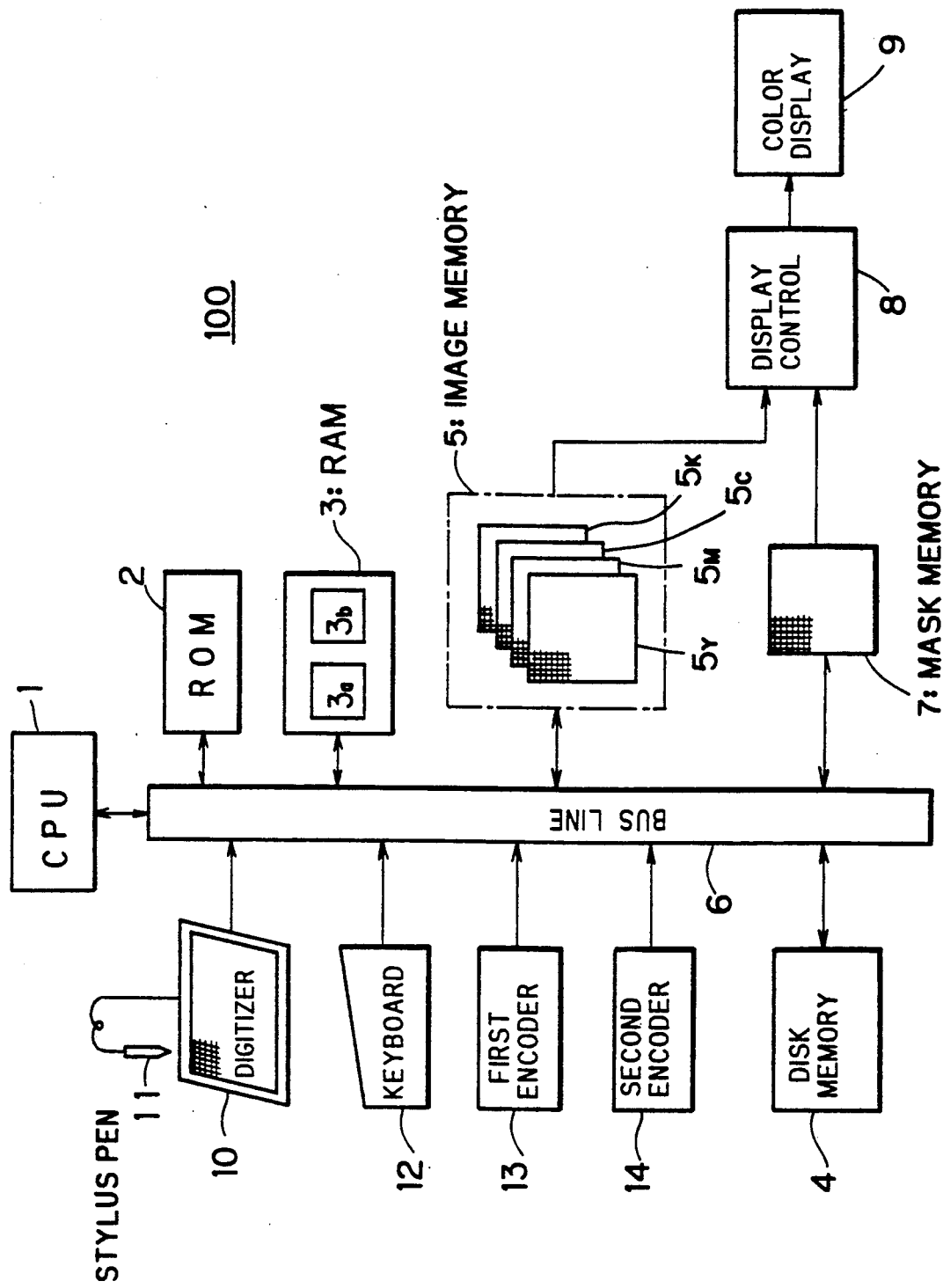

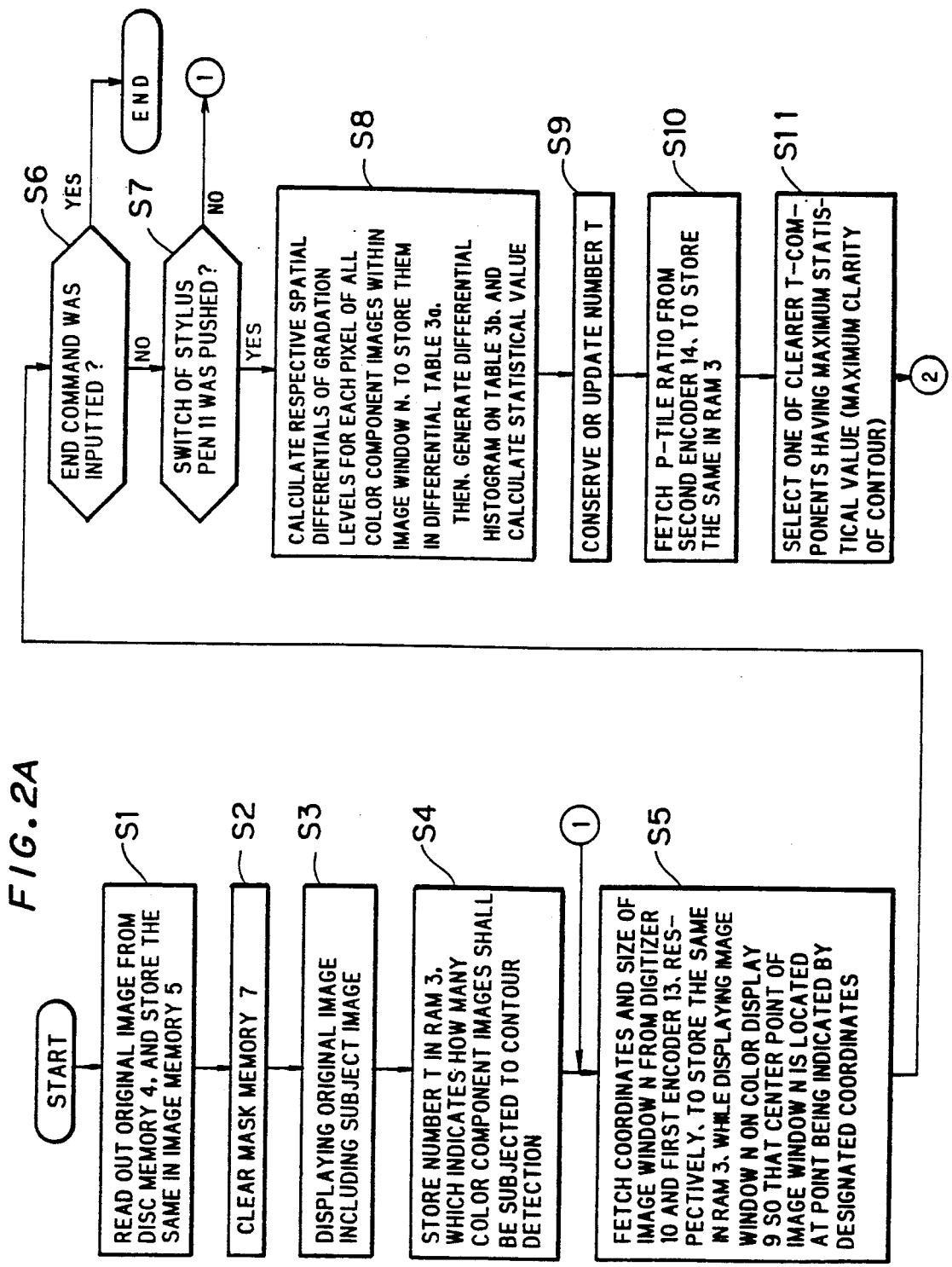

N: IMAGE WINDOW
9
CT: CONTOUR
I: SUBJECT IMAGE

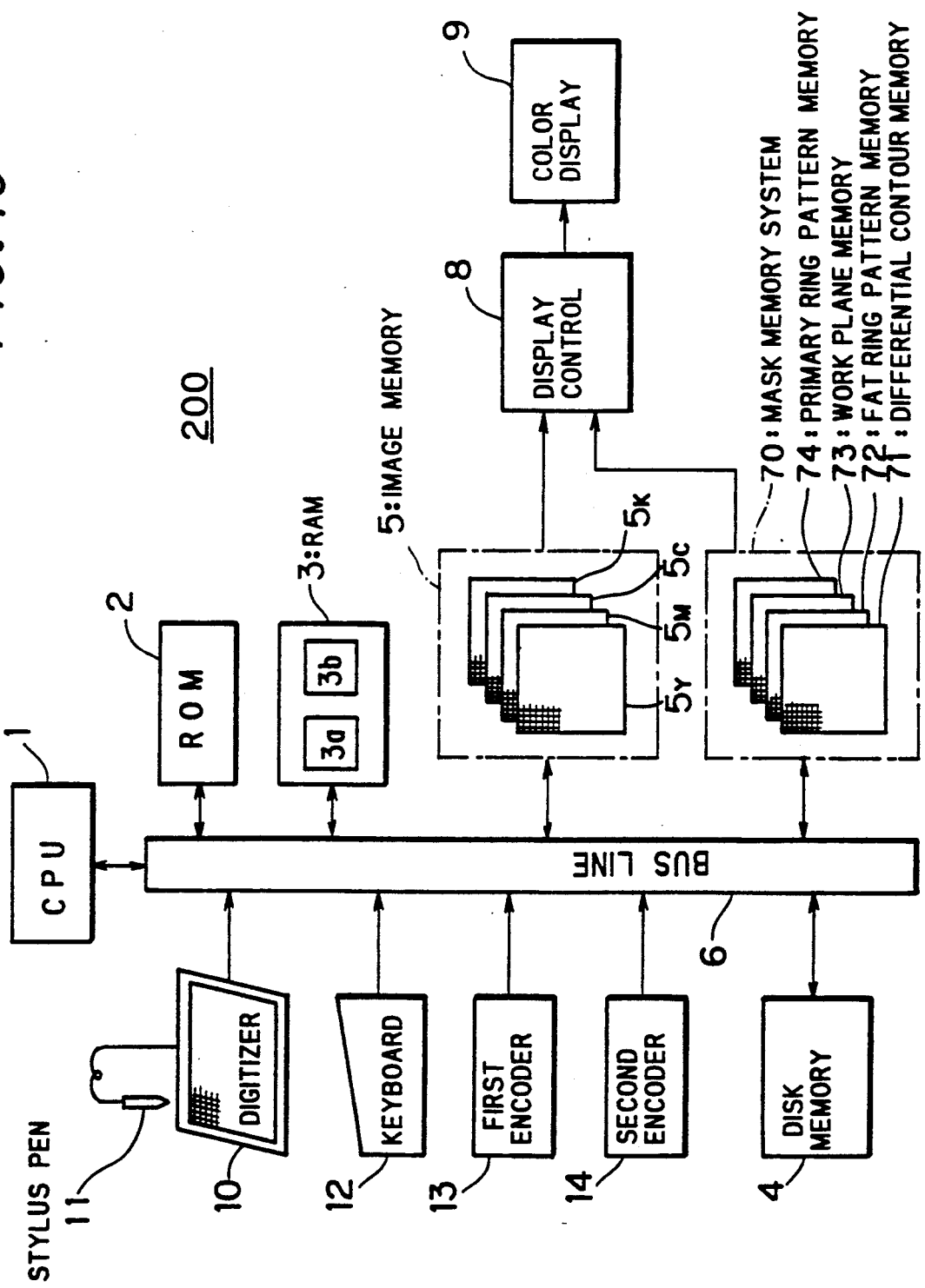

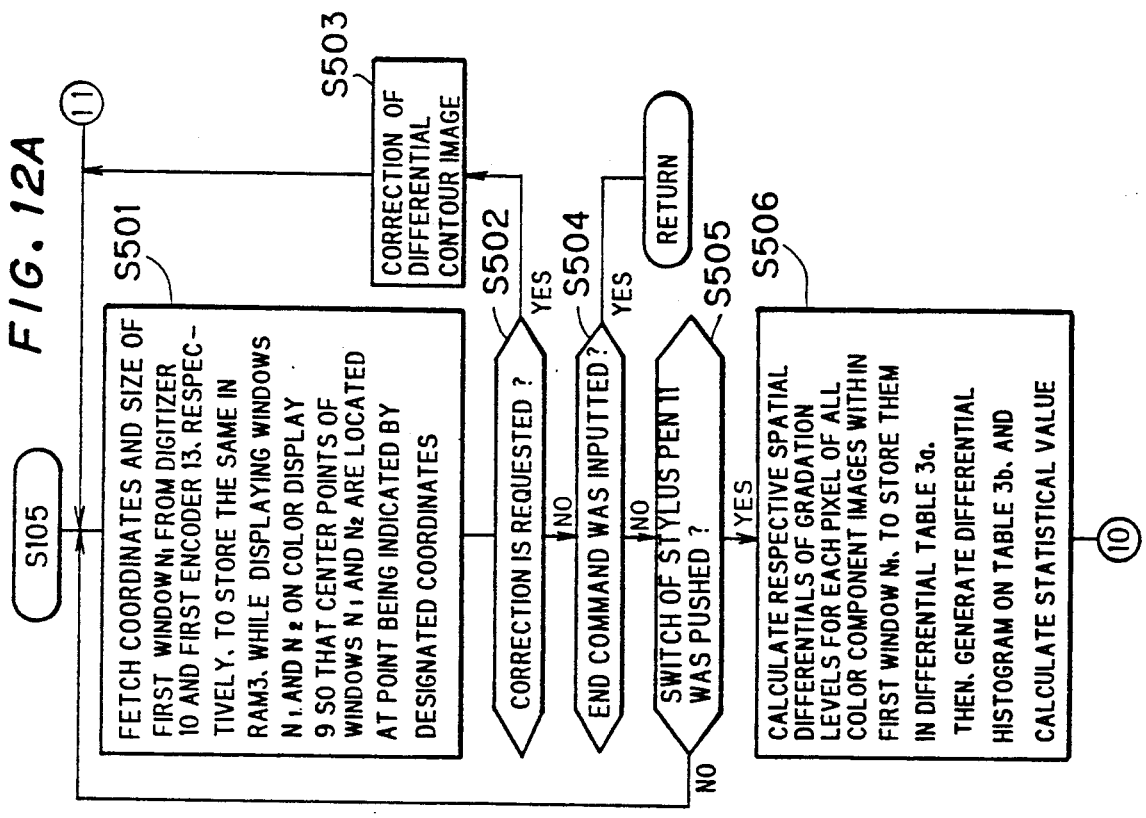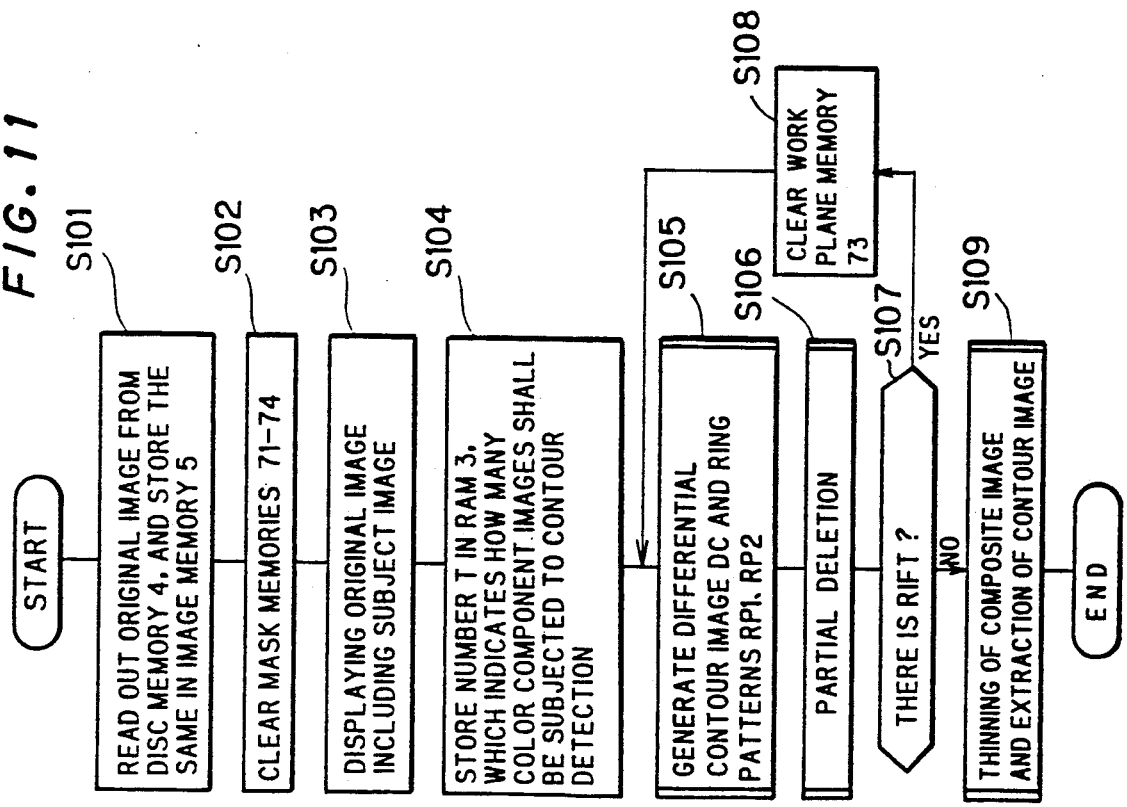

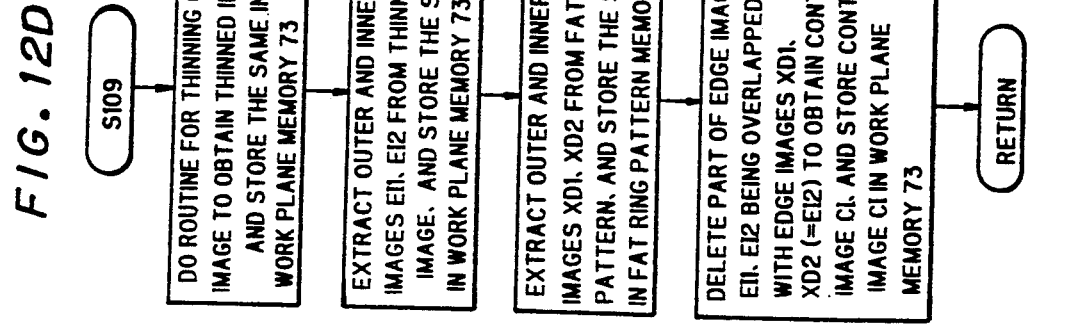
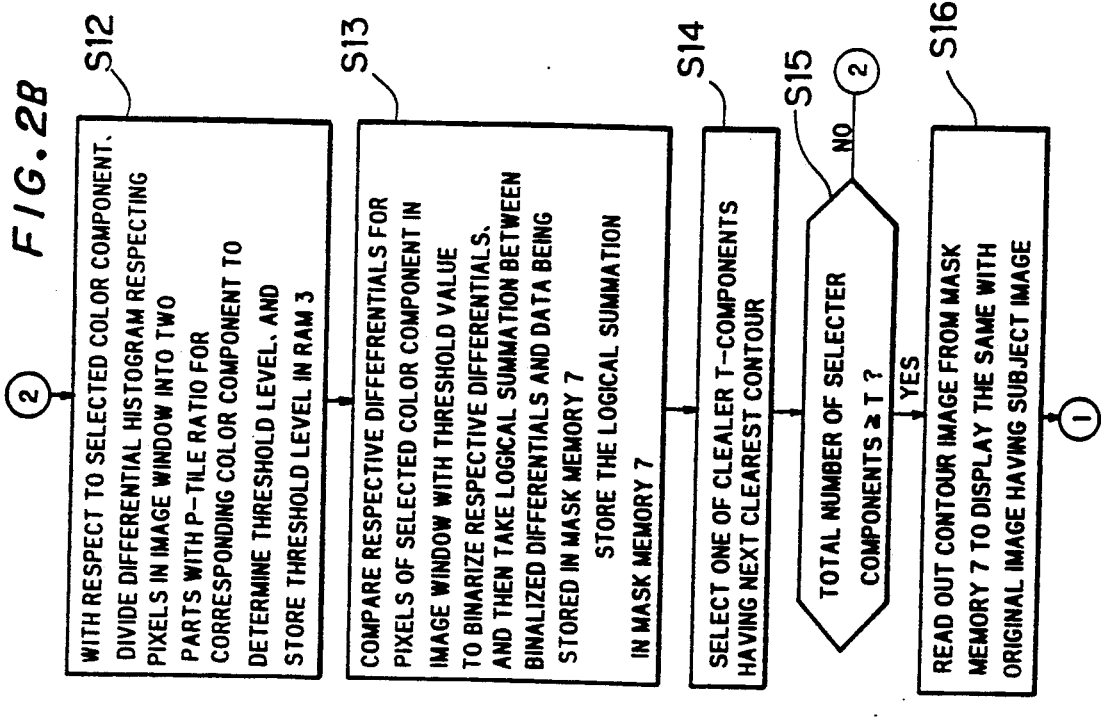

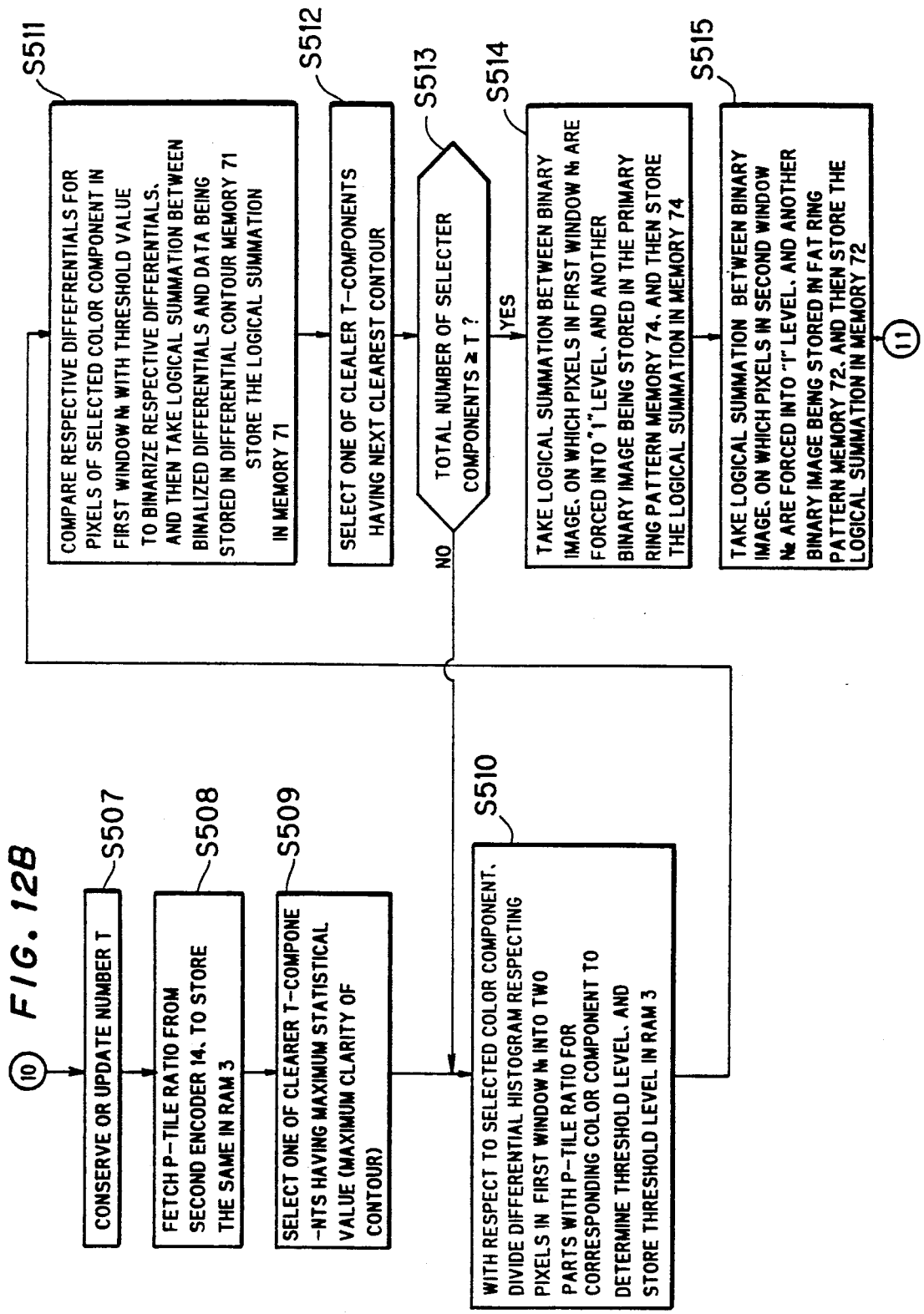

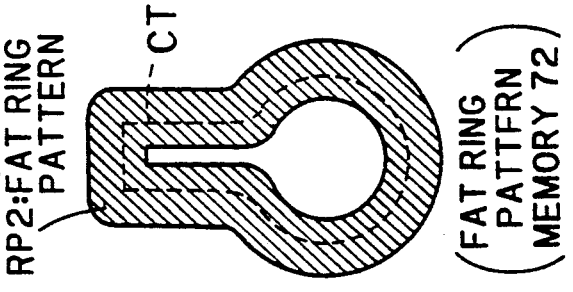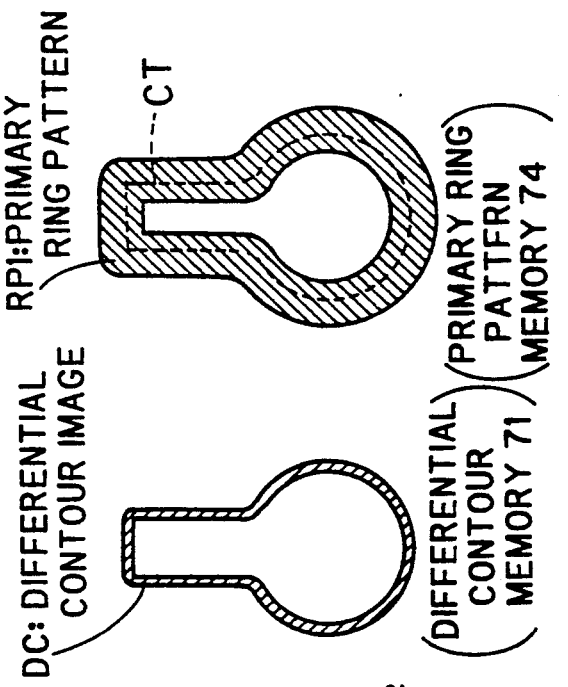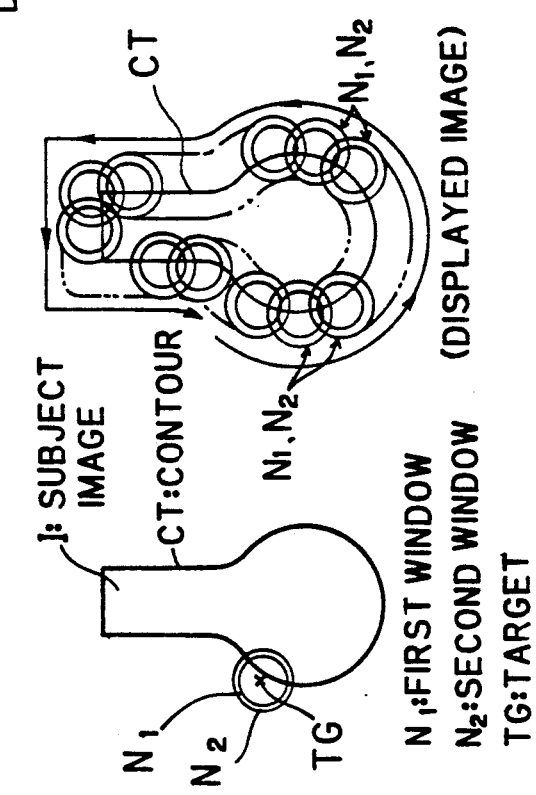

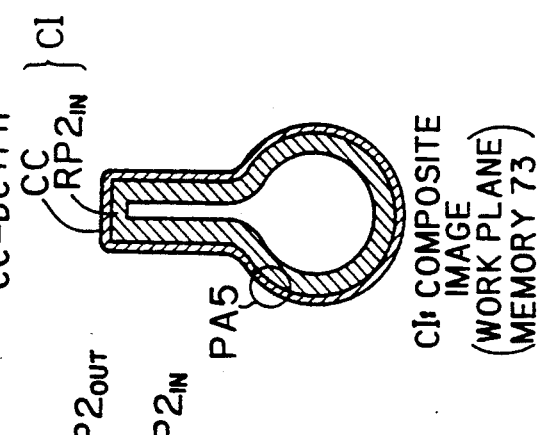
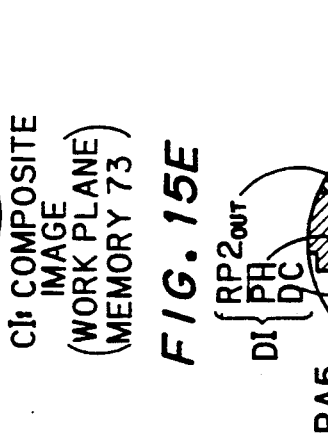
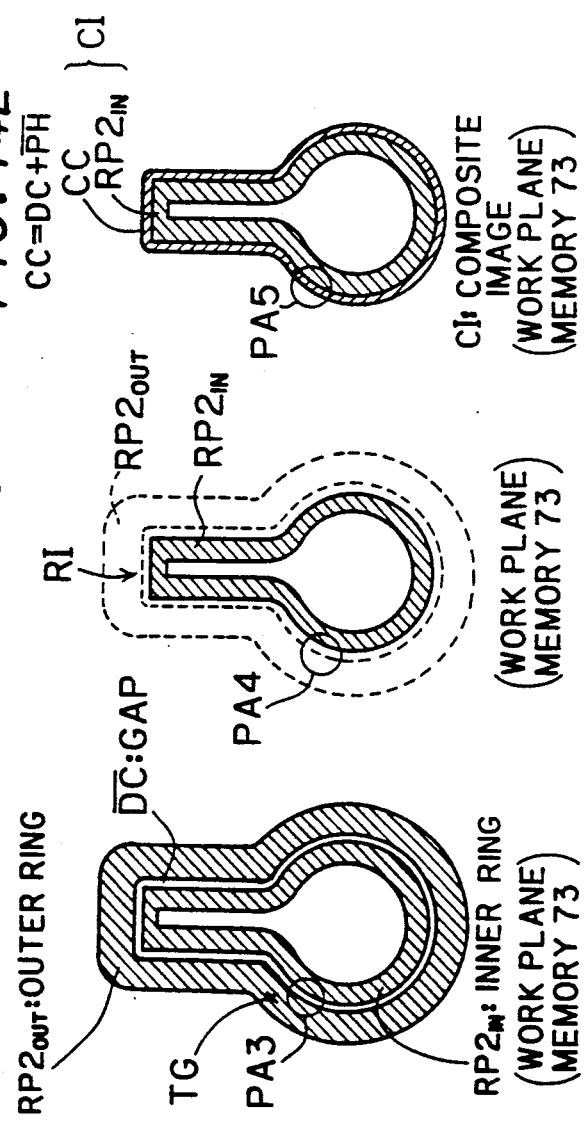
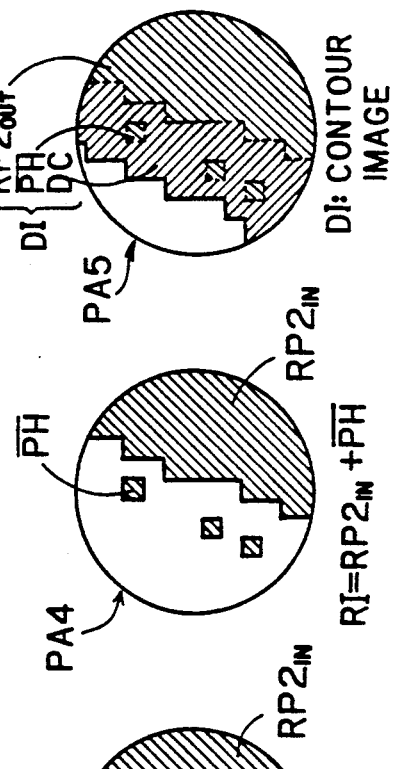
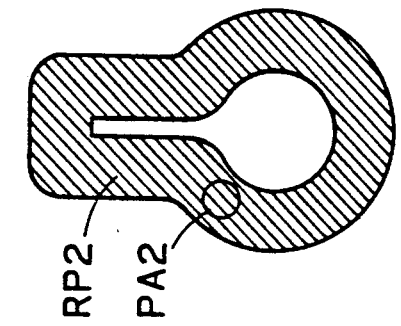
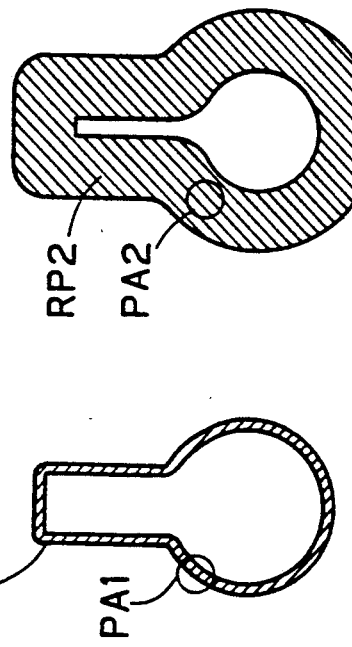
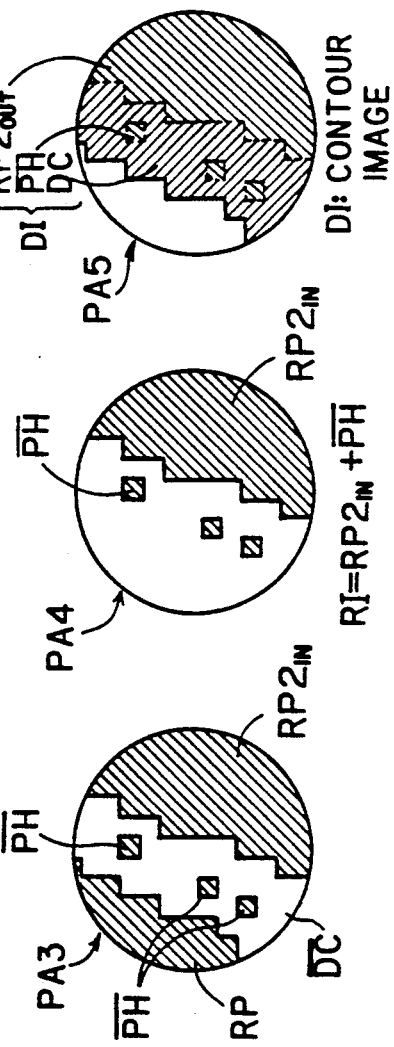
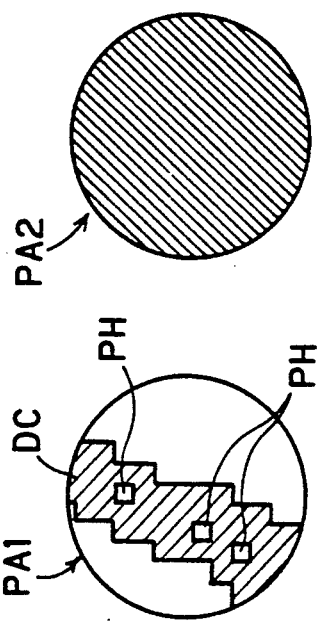

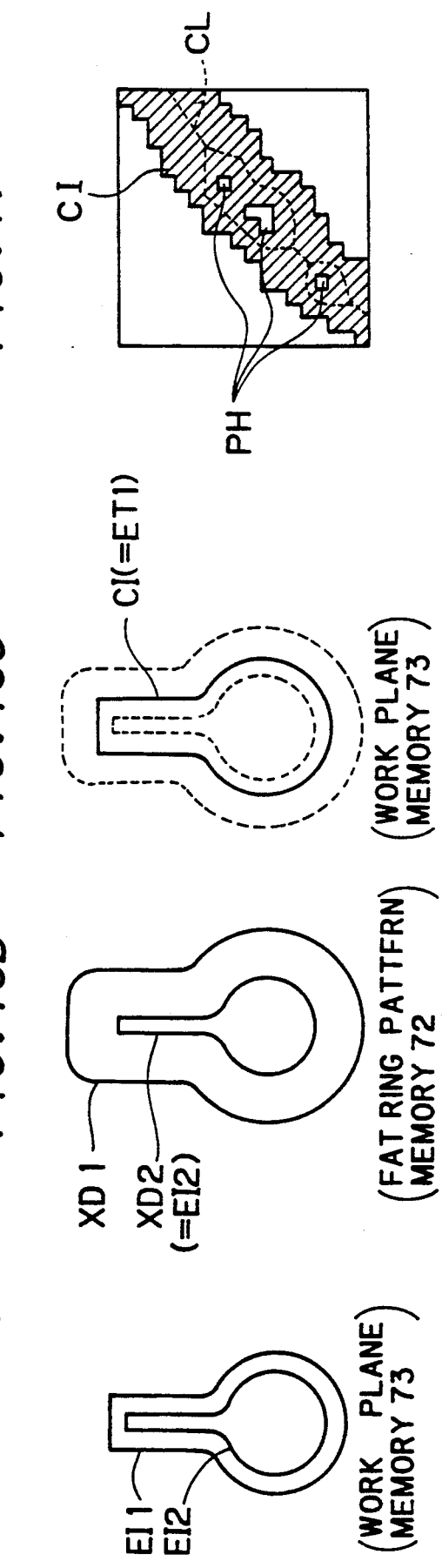

METHOD OF EXTRACTING CONTOUR OF A SUBJECT IMAGE FROM AN ORIGINAL

BACKGROUND OF THE INVENTION

1. Field of the Invention

The present invention is related to a method of extracting the contour of a subject image from an original, and more particularly to an improvement for generating contour image data expressing the contour.

2. Description of Background Art

In a photographic process for printing, a cut-out mask is often prepared in order to cutout a desired image area from an original image plane. When a photograph of goods is prepared as an original image for printing a catalog of the goods, for example, the image of the goods is separated form the background image through a cut-out mask adapted to the shape of goods. The image area extracted through the cut-out mask is then combined with other images according to a desired layout, and is reproduced on a photosensitive film with a graphic arts scanner. The cut-out mask may be also used to extract a desired image area for tone correction.

In electronic image processing, such a cut-out mask is produced in the form of a binary mask pattern, in which the inner region of a desired image area is indicated by a logical high ("1") level while the outer region is indicated by a logical low ("0") level. The boundary between the inner and outer regions is the contour of the desired image area. An image masking or image cutting-out operation is attained by determining for each pixel whether the original image data is valid or invalid with reference to the binary mask pattern, where "valid" and "invalid" are indicated by the "1" and "0" levels, respectively.

One of the most practical techniques for producing a binary mask pattern employs a small window being set on a small area including a part of the contour. The respective density levels of pixels surrounded by the small window are compared with a threshold level, and the "1" level is given to pixels whose density levels are higher than the threshold level while the "0" level is given to pixels whose density levels are lower than the threshold level. Therefore, when the threshold level is so selected as to be an intermediate level between respective optical densities of an desired image and a background image thereof, the inner region and the outer region of the desired image can be distinguished from each other on a bit plane as a "1" level region and a "0" level region, respectively.

The small window is then moved to the next small area along the contour, while observing the original image and the small window on a CRT, and the above-indicated operation is repeated for the next small area. When the repetition is completed for the whole image boundary, the contour image appears on the bit plane as a closed boundary between the "1" level region and the "0" level region. The binary mask pattern can be obtained by filling the region surrounded by the contour on the bit plane with the "1" level.

Although the conventional technique can be applied to many types of image contours, it has a disadvantage that the threshold level should be frequently updated as the small window is moved along the contour because the density level of the original image may change considerably along the contour. Since the selection of the threshold value is delicate work, a relatively long time is required for frequently updating the threshold value, even for a skilled operator.

Furthermore, when the original image is a color image expressed by a set of color-component images, a problem results respecting what color-component image is employed for detection of the contour. In particular, if the respective parts of the contour exist on different color components, the whole of the contour cannot be systematically detected, since the conventional technique employs one or more color-component images which are selected through an intuition of an operator.

Another disadvantage of the conventional technique is that rifts and pin holes in the contour image are hardly eliminated or compensated through the contour detection process.

DEFINITION OF TERMS

In the present disclosure of the invention, some terms are used in broad senses, as follows:

(1) Gradation Level or Density Level

The term expresses not only an optical density level on an image, but also values representing the optical density level, such as a Munsell value, a signal level which is obtained by photoelectrically reading the image, and a halftone dot percentage in halftone recording of the image.

(2) Process of Generating or Obtaining an Image

The term "generating an image" is used not only for indicating "generating an image in the form of a recorded image or a displayed image" but also for indicating "generating an image in the form of image data or signals without visual reproduction thereof". The signals may be electric signals, optical signals or the like.

(3) Process of Storing an Image

The term includes the process where image data expressing the image is stored in a memory device. Similarly, the term "an image in a memory" may be read as "an image which is expressed by an image data being stored in a memory".

SUMMARY OF THE INVENTION

The present invention is intended for a method of generating contour image data expressing a contour of a subject image which is included in an original image, such original image being expressed by a plurality of pixels having a gradation or density level.

According to the present invention, the method comprises the steps of: (1) displaying the original image on a display means; (2) designating an area on the original image while observing the original image on the display means so that the contour belongs to the area; (3) calculating respective spatial differentials of gradation levels with respect to pixels included in the area; (4) determining a threshold level for the respective spatial differentials; (5) comparing the respective spatial differentials with the threshold level, to thereby classify the pixels included in the area into a first group of pixels having differentials larger than the threshold level and a second group of pixels having differentials smaller than the threshold level; (6) extracting pixels belonging to the first group from the pixels included in the area; to thereby specify extracted pixels, and (7) generating the contour image data expressing a contour image on which the extracted pixels represent the contour.

Preferably, the steps (3) through (6) are conducted for each partial area which is designated by an image window movable along the contour. The respective pixels which are extracted in the step (6) for each partial area are connected with each other in an image memory, whereby the contour image data is obtained in the image memory.

Preferably, a differential histogram of the respective spatial differentials is generated for each partial area. The differential histogram is divided into two parts with a designated percentile ratio. The boundary level between the two parts is used for determining the threshold level.

When the original image is a color image that is separated into color-component images, it is preferred to generate the contour image data on the basis of two or more color-component images. Respective contour images which are obtained from a plurality of color-component images are overlapped with each other through a logical summation thereof. Through the logical summation, a contour image having no rifts is obtained.

In the preferred embodiment, the plurality of color component images are selected according to degree of image clarity on the contour, which is estimated with a statistical value expressing the degree of separation or split in distribution of the respective spatial differentials for each partial area.

According to the curvature of the contour, the size of the image window may be changed. The number of color component images to be used in contour detection may be also changed for each partial area.

Since the respective spatial differentials are employed for the contour detection and the threshold value is determined according to a percentile ratio, frequent updating of the threshold level through an intuition of an operator is unnecessary for contour detection.

In one aspect of the present invention, the method comprises the steps of: (1) calculating respective spatial differentials of gradation levels with respect to pixels on the original image; (2) comparing the respective spatial differentials with a threshold level to binarize the pixels on the original image; whereby a differential contour image expressing the contour is obtained; (3) generating a ring image covering the differential contour image with a margin; (4) dividing the ring image into an inner ring image and an outer ring image with the differential contour image, the inner and outer ring images being separated from each other across a gap corresponding to a reverse image of the differential contour image; (5) deleting one of the inner and outer ring images, to thereby generate a remaining ring image; (6) combining the remaining ring image with the first contour image to generate a composite image in the shape of a ring; (7) generating a loop image which expresses a loop extending along an edge of the composite image; and (8) the contour image data in accordance with the loop image.

Preferably, the composite image is thinned by deleting one of inner and outer edge portions of the composite image, to obtain a thinned image having the shape of a ring. Then, generated are a first edge image which expresses inner and outer edges of the thinned image, and a second edge image which expresses inner and outer edges of the ring image.

The loop image is obtained by deleting a part of the first edge image at which the second edge image overlaps with the first edge image.

In a preferred embodiment of the present invention, first and second image windows are designated on the original image, which is being displayed on a display device. The first image window is used for designating partial areas from which the differential contour image is extracted, while the second image window is used for generating the ring image. The size of the second image window is larger than that of the first image window, whereby the ring image covers the contour with a margin.

In the composite image, pin holes that are included in the differential contour image compensate reversed pin holes included in the reverse image of the differential contour image.

Accordingly, an object of the present invention is to systematically generate a contour image data expressing the contour of a subject image without frequent change of a threshold level.

Another object of the present invention is to obtain a contour image having no rifts.

Another object is to obtain a contour image without pin holes.

Further, another object is to obtain a contour image that is located at positions suitable for giving a desirable visual impression to observers.

Another object is to provide a process of detecting a contour in which respective process stages can be observed through a display device in order to easily find and correct rifts of the contour image.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing an image processing system 100 according to a first preferred embodiment of the present invention, FIGS. 2A and 2B are sections of a flow chart showing an operation of the system 100, FIG. 10 is a block diagram showing an image processing system 200 according to a second preferred embodiment of the present invention, FIG. 11 is a flow chart showing an operation of the system 200, FIGS. 12A-12B, 12C and 12D are flow charts showing details of the process steps S105, S106 and S109 in FIG. 11, respectively, FIGS. 13A-13E, FIGS. 14A-14E and FIGS. 16A-16C are image diagrams showing images obtained in the operation of the system 200, FIGS. 15A–15E are enlarged diagram showing respective images in areas PA1–PA5 in FIGS. 14A–14E, and FIG. 17 is a diagram for explaining an advantage of the present invention.

DESCRIPTION OF THE PREFERRED EMBODIMENTS

Figure 3A:
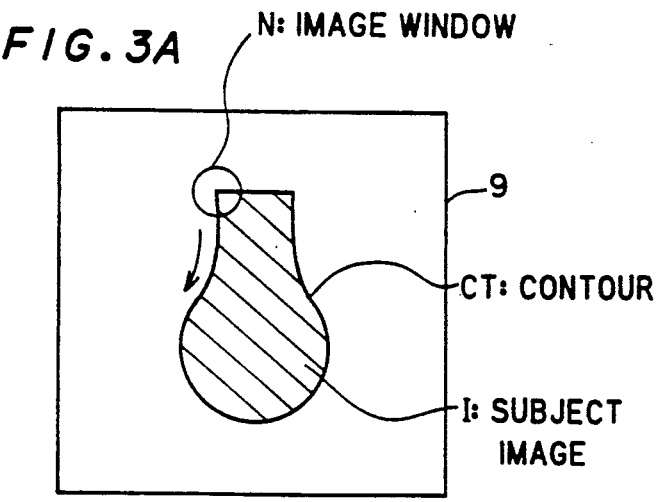
FIGS. 3A-3C are image diagrams showing movement of an image window N on an image plane.

A. Overall Structure and Functions of First Embodiment

FIG. 1 is a block diagram showing an image processing system 100 according to a first preferred embodiment of the present invention, where the system 100 is so constructed as to extract the contour of an original image for generating a binary mask pattern. The system 100 is provided with a CPU 1 in the form of a microcomputer for controlling the system 100, and operation programs for the CPU 1 are previously stored in a ROM (or RAM) 2. A RAM 3 can store various data tables such as a differential table 3a and a differential histogram table 3b, which will be described later.

An orginal color image (not shown) having gradation is read with a photoelectric image reader for each pixel, while separating color components thereof from each other, whereby original image data expressing the original image are obtained as a set of color-component images for yellow (Y), magenta (M), cyan (C) and black (K). These color component images each having gradation are stored in a disk memory 4 for each pixel. Then, the YMCK color-component images are read out from the disk memory 4 under the control of the CPU 1, and are transferred through a bus line 6 to image memories 5Y, 5M, 5C and 5K, respectively, to be stored therein for each color component.

As will be described later, the system 100 generates a contour image expressing the contour of the original image. The contour image is stored in a mask memory 7. A display controller 8 is electrically connected to the image memory 5 and the mask memory 7, and the following functions are given to the display controller 8:

(1) D/A conversion of the image data;

(2) A function of receiving the YMCK color-component images form the image memory 5 and converting the same into image signals for red (R), green (G) and blue (B) colors;

(3) A function of controlling a color display 9 such as a color CRT so that an image window or an image window N (FIG. 3A), which will be described later, is displayed on the color display 9 according to an operational input from an X-Y digitizer 10;

(4) Functions of modifying the magnification of a displayed image, rotating a displayed image, adjusting image contrast on the color display 9, and converting an image stored in the mask memory 7 into a color image or a semitransparent color image for displaying the same on the color display 9;

(5) A function of changing a priority order in displaying a plurality of color-component images;

(6) A function of overlapping an image stored in the image memory 5 and that stored in the mask memory 7 for dispalying the overlapped image on the color display 9.

The digitizer 10 is provided with a stylus pen 11, and the coordinates of a desired point on an image plane are inputted with the combination of the digitizer 10 and the stylus pen 11; the coordinates corresponding to respective storage addresses in the image memory 5 and the mask memory 7. When the coordinates are inputted, the image window is displayed at a position on the color display 10 while adjusting the center point of the image window N at the inputted coordinates on the display plane. The stylus pen 11 is provided with a push switch (not shown), and, in response to manual operation of the push switch, the CPU 1 starts detecting the contour within the image window N being currently displayed.

The system 100 further comprises a keyboard 12 for inputting various commands and numerical data. One of the numerical data is that indicating how many color-component images shall be subjected to the contour detection. Encoders 13 and 14 are connected to the CPU 1 through the bus line 6. The size of the image window N is designated by an operator, and is encoded with the first encoder 13, to be transmitted to the CPU 1. Similarly, a percent-tile ("p-tile") ratio, which will be used for the contour detection, is designated by the operator, and is encoded with the second encoder 14. These encoders 13 and 14 are used not only in initial designation of respective data but also in updating or change thereof, and respective input operations through the encoders 13 and 14 are attained by manual operation of a variable resistor (not shown) provided in each encoder.

B. Operation of First Embodiment (B-1) Initialization and Display of Original Image Referring also to FIGS. 2A–2B, the image data expressing the color original image is read out from the disk memory 4 in response to a start command inputted from the operator (the process step S1). The original image includes a subject image whose contour is to be extracted, and the original image consists of the YMCK color-component images. The YMCK color-component images are transmitted to the image memory 5, to be stored in their corresponding image memories 5Y, 5M, 5C and 5K. The mask memory 7 is then cleared at the process step S2.

The YMCK color-component images are then transmitted to the display controller 8, and are converted into analog signals therein. The YMCK analog signals are further converted into RGB analog signals, to be supplied to the color display 9, whereby the original image including the subject image is displayed on the color display 9 (the process step S3). FIG. 3A shows an example of the displayed image, where the subject image I and contour CT thereof are schematically illustrated in a rectangular display plane.

In the next step S4, the operator inputs a number T indicating how many color-component images shall be subjected to the contour detection in a descending order in degree of image clarity of the contour CT. Criteria for determining the degree of image clarity of the contour CT will be described later. For the set of the YMCK color component images, the number T is selected from integers "1" through "4". The number T thus inputted is delivered to the RAM 3, to be stored therein as an initial value of T (the process step S4).

(B-2) Designation of Image Window and Spatial Differentiation of Density Levels

The operator then inputs coordinate data with digitizer 10 and the stylus pen 11. The CPU 1 fetches the coordinate data and the designated size of the image window from the digitizer 10 and the first encoder 13, respectively. In the preferred embodiment, the shape of the image window N is a circle, and therefore, the size thereof is designated by its radius. These data thus designated are stored in the RAM 3, and the image window N having the designated radius is displayed on the color display 9. The center point of the image window N is given by the inputted coordinate data. An example of the image window N is shown in FIG. 3A.

The position and the size of the image window N changes in response to movement of the stylus pen 11 and manual operation of the first encoder 13, respectively. The operator moves the image window N through movement of the stylus pen 11 while observing the color display 9 until a part of the contour CT appears in the image window N (the process step S5).

In the next process step S6, it is detected whether an end command has been inputted or not. Before completion of the contour detection, the end command has not been inputted yet, and therefore, the process advances to the process step S7. When the image window N is moved to a position on the contour CT, the operator pushes the switch attached to the stylus pen 11. The push of the switch is detected in the process step S7, and then the process goes to the next process step S8. If the switch is not pushed to thereby indicate that the stylus pen 11 is being moved, the process returns to the process step S5.

Figure 4A:
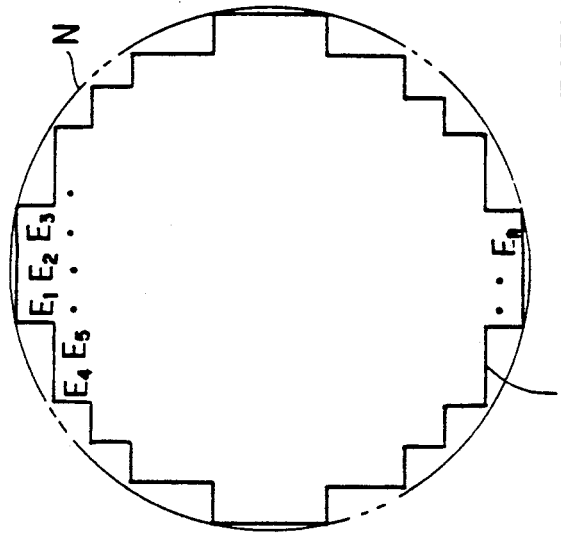
FIG. 4A is a schematic diagram showing respective density levels of pixels in the image window N.

In the process step S8, the YMCK color-component images within the image window N are serially read out from the image memory 5, and then spatial differentials of the density levels are calculated for each color component and for each pixel existing in the inner region of the image window N. FIG. 4A shows an array of pixels in the image window N, where pixels having density levels $P_1-P_n$ of a given color component are shown in the image window N. The number n is an integer indicating the total number of pixels in the image window N. The spatial differentiation of the density levels $P_1-P_n$ may be performed through a differentiation mask of m x m pixels, where the number m is an integer larger than one.

Figure 4B:
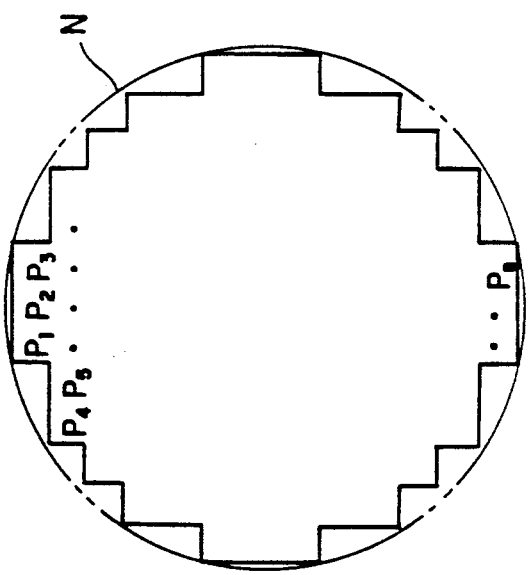
FIG. 4B is a schematic diagram showing differentials stored in a differential table.
Figures 5A, 5B, 5C, 5D:
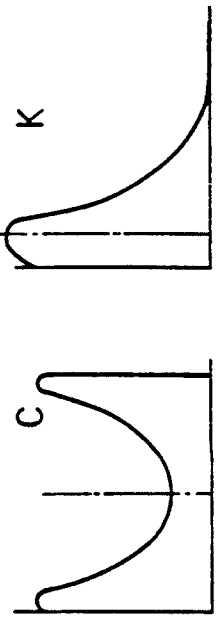
FIGS. 5A-5D are graphs showing examples of differential histograms for respective color components.

The spatial differentials $E_1-E_n$ thus obtained from the density levels $P_1-P_n$ are stored in the differential table 3a for each pixel, as shown in FIG. 4B. Since the density levels of pixels change considerably across the contour CT and are nearly constant at areas other than the contour CT, the differentials $E_i$ (i=1−n) are large for pixels on the contour CT and are small for other pixels. The differentials for Y, M, C and K—colors are hereinafter referred to with symbols $E_{Fi}$ (F=Y, M, C and K: i=1−n), respectively.

The frequency of occurence in differentials are counted with counter means (not shown), to thereby generate differential histograms for respective color-components Y, M, C and K—colors as shown in FIG. 5A through FIG. 5D, respectively. These differential histograms are stored in the differential histogram table 3b.

For each color component, the CPU 1 then calculates a statistical value expressing the degree of dispersion in the distribution of the differentials $E_{Fi}$(i=1−n). When respective statistical values for the YMCK color components are expressed as $S_Y$, $S_M$, $S_C$ and $S_K$, respectively, the statistical values $S_F$(F=Y, M, C and K) may be:

$$\text{Dispersion} = \frac{1}{n}\sum_{i=1}^{n} E_{Fi}^2 - \left(\frac{1}{n}\sum_{i=1}^{n} E_{Fi}\right)^2 \quad (1)$$

or $$\text{Absolute Sum of Deviations} = \sum_{i=1}^{n} |E_{Fi} - \overline{E_F}|^2 \quad (2)$$

where $$\overline{E_F} = \frac{1}{n}\sum_{i=1}^{n} E_{Fi} \quad (3)$$

An arbitrary one of satistical values other than those of the expressions (1), (2) and (3) may be also employed in the present invention, as long as it expresses the degree of dispersion.

More particularly, the statistical values $S_Y$, $S_M$, $S_C$ and $S_K$ represent the degree of separation or double-peak split in the distribution of the differentials $E_Y$, $E_M$, $E_C$ and $E_K$, respectively. When the contour CT is a clear contour, the differentials $E_{Fi}$ on the contour CT concentrate on large values, while the differentials other than on the contour CT concentrate on small values. As a result, the distribution of the differentials $E_{Fi}$ splits into a pair of strong peaks. On the other hand, when the contour CT is an unclear contour, the differentials $E_{Fi}$ distribute within a wide range, so that a pair of weak peaks or only a single peak appears in the differential histograms. In summary, the statistical values $S_Y$, $S_M$, $S_C$ and $S_K$ which are calculated according to the mathematical expression (1) or (2) have large values for a clear contour, and small values for an unclear contour.

FIG. 5A through FIG. 5D show examples of the respective histograms of the differentials $E_{Yi}$, $E_{Mi}$, $E_{Ci}$ and $E_{Ki}$, where the horizontal axis represents the differential value and the vertical axis represents the frequency of occurence or the number of pixels. The differential histogram for Y-color has a pair of weak peaks, and that for M-color has no substantial peak. A pair of strong peaks exists in the differential histogram for C-color, while there is only one peak in the differential histogram for K-color. Therefore, the statistical values $S_Y$, $S_M$, $S_C$ and $S_K$ for the distribution shown FIGS. 5A through 5D are estimated as:

$$S_C > S_Y > S_M > S_K \quad (4)$$

When the number T which is designated in the process step S4 is three, the color component images for C, Y and M-colors are selected for the contour detection according to the order of the expression (4). In other words, the designated number of the color-component images are selected in a descendins order of respective statistical values. The selected color-component images are hereinafter called as "clearer T-components". The statistical values $S_Y$, $S_M$, $S_C$ and $S_K$ which are obtained in the process step S8 are stored in the RAM 3 for the following process steps.

The number T may be updated at this stage with the keyboard 12, and if updated, the new number T is stored in the RAM 3 in place of the old number T. When the number T is not updated, the old number T is conserved or maintained in the RAM 3 (the process step S9).

In the next process step S10 (FIG. 2A), the designated p-tile ratio α is fetched from the second encoder 14, and is stored in the RAM 3. Criteria for determining the value of the p-tile ratio α will be explained later.

Then, in the process step S11, a color-component image having a maximum statistical value is selected from the clearer T-components.

As described above, the color-component image having the maximum statistical value is that having the clearest contour among the YMCK color-component images. In the examples shown in FIG. 5, the color-component image for C-color is selected in the process step S11.

(B-3) Binarization of Pixel Levels and Extraction of Contour Image

Figure 6:
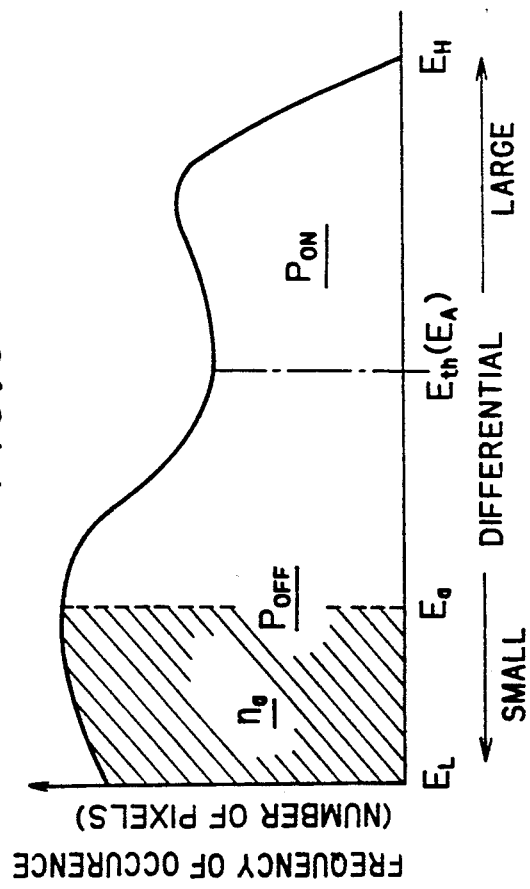
FIG. 6 is a diagram schematically showing a process of determining a threshold level $E_{th}$ with a differential histogram and a designated percentile ratio.

In the next process step S12, the p-tile ratio $\alpha$ is read out form the RAM 3. The respective numbers of pixels in the differential histogram for the selected color component, i.e., the C-component image, are serially added up from the lower limit of the differential values. When the lower and upper limits of the differential values are expressed as $E_L$ and $E_H$ (FIG. 6) in the differential histogram, respectively, and the sum of the pixels up to an arbitrary value $E_a$ is expressed as $n_a$, the addition of pixels is continued until the condition:

$$n_a/n \geq \alpha \tag{5}$$

is satisfied. When the differential value $E_a$ at which the condition (5) is satisfied at the first time is expressed as $E_A$, a threshold level $E_{th}$ which will be used in the following process steps is defined by the value $E_A$. In other words, the threshold level $E_{th}$ is so defined that a first sum $P_{OFF}$ of pixels between the lower limit $E_L$ and the threshold level $E_{th}$ and a second sum of pixels between the threshold level $E_{th}$ and the upper limit $E_H$ satisfy the condition:

$$\alpha = P_{OFF} / (P_{ON} + P_{OFF}) \tag{6}$$

where
$$P_{ON} + P_{OFF} = n \tag{7}$$

The p-tile ratio $\alpha$ may be defined according to one of other expressions, as long as the differential histogram is divided into two parts with the boundary corresponding to the p-tile ratio $\alpha$. For example, one of the following definitions or conditions (8) through (10) may be employed.

$$\alpha = P_{ON}/(P_{ON} + P_{OFF}) \tag{8}$$

$$\alpha = P_{ON}/P_{OFF} \tag{9}$$

$$\alpha = P_{OFF}/P_{ON} \tag{10}$$

The threshold level $E_{th}$ thus obtained is stored in the RAM 3.

Then, with respect to the selected color component, the respective differentials of pixels within the image window N are read out from the differential table 3a. The respective differentials are compared with the threshold value $E_{th}$, so that a logical value "1" is given to pixels whose differentials are larger than the threshold level $E_{th}$, and the other logical value "0" is given to pixels whose differentials are smaller than the threshold level $E_{th}$, whereby the pixels within the image window N are binarized.

Figure 7:
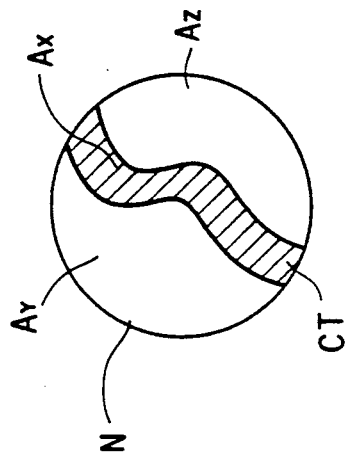
FIG. 7 shows a distribution of contour pixels in an image window N.
Figure 8B:
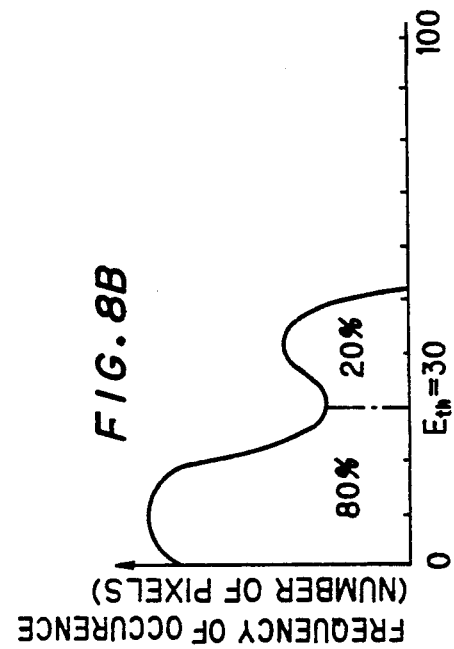
FIGS. 8A and 8B are graphs showing determination of the threshold value Eth for two types of the differential histograms.

The binarization in the preferred embodiment has the following advantage: Since the threshold level $E_{th}$ is so determined that the ratio of the under-threshold pixels to all pixels in the image window N coincides with the predetermined p-tile ratio $\alpha$, the threshold level $E_{th}$ is found between the two peaks of a differential histogram regardless of individual character of the image within the image window N. For example, when it is desired that contour pixels be so extracted from pixels within the image window N that the number $A_X$ of pixels on the contour CT (FIG. 7) and the respective numbers $A_Y$, $A_Z$ of pixels on both sides of the contour CT satisfy the condition:

$$A_X/(A_X + A_Y + A_Z) = 20\% \tag{11}$$

the p-tile ratio $\alpha$ is set at $80/100 = 80\%$ in accordance with the expressions (6) and (11). In response to the p-tile ratio $\alpha = 80\%$, the threshold level $E_{th}$ in a relative scale is found as $E_{th} = 70$ for the high-differential distribution (FIG. 8A) and $E_{th} = 30$ for the low-differential distribution (FIG. 8B). The threshold level $E_{th}$ is at the valley between two peaks in both cases, so that high-differential pixels and low-differential pixels are distinguished from each other with the threshold level $E_{th}$. This is because the pixels in distribution are always divided into the ratio 80:20.

Figure 8A:
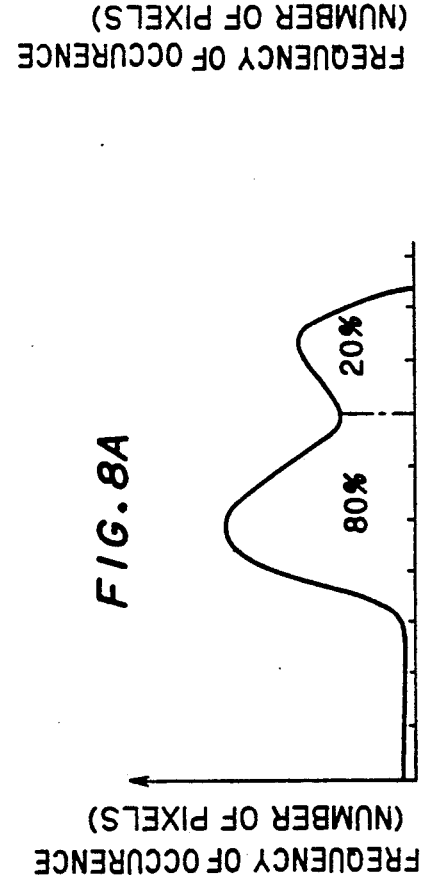

The distribution of FIG. 8A appears in the case where the density levels drastically change across the contour, while that of FIG. 8B appears in the case where the density levels slowly change across the contour. Therefore, according to the present method of determining the threshold level $E_{th}$, an optimum binarization can be automatically performed even if the contour CT has both a sharp part and an unsharp part. As understood from the description indicated above, the p-tile ratio $\alpha$ is predetermined according to a desired rate at which pixels in the image window are to be recognized as pixels on the contour CT.

The binary image or "a first binary image" thus obtained within the image window N is stored in the mask memory 7 for each pixel through a read-modify-write operation. That is, the binary image or "a second binary image" which has been stored in the mask memory 7 is read out from the same, and a logical summation of the first and second binary images is taken for each pixel to obtain a third binary image. The third binary image is stored in the mask memory 7 in place of the second binary image (the process step S13). Since the mask memory 7 was cleared in the process step S2, the second binary image in the first stage is a "white" image in which all pixels are at "0" level. Accordingly, the third binary image which is obtained in the first execution of the process step S13 coincides with the first binary image. As will be described later, the process step S13 is repeated T-times for the current position of the window N. The process step S13 for taking the logical summation is meaningful in the second through T-th repetitions thereof, and the advantage thereof will be also described later.

After the process step S13 for the selected component is completed, a color-component image including the contour CT in the next clearest appearance among the clearer T-components is further selected by comparing the respective statistical values with each other and finding the next largest one among them (the process step S14). In the example shown in FIGS. 5A through 5D, the color-component image for Y-color is selected according to the order in the inequality (4). Since the selection of color-component images through the proces steps S11 and S14 has been executed only two times in total up to now, the process returns to the process step S12 through the process step S15 in the example where the number T is three.

The process steps S12 through S14 are repeated for the new selected component, where the p-tile ratio $\alpha$ having been fetched in the previous step S10 is used also in the repeated steps. A new threshold level $E_{th}$ for the new selected component is determined on the basis of the p-tile ratio $\alpha$ and the differential histogram for the new selected component. A binary image is then generated within the image window N on the new selected component, to be stored in the mask memory 7 through the read-modify-write operation. The "selected component" is then further updated into the color-component image for M-color, and the process steps S12 through S14 are further repeated.

Figure 9A:
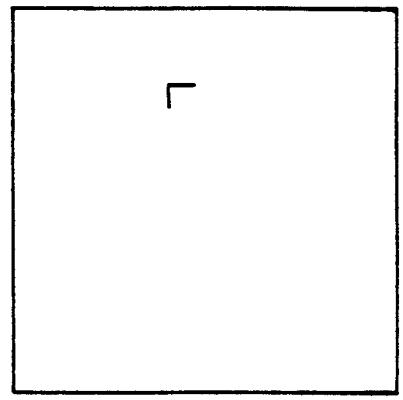
FIGS. 9A through 9C are image diagrams showing a process of obtaining a differential contour image step by step.
Figure 3B:
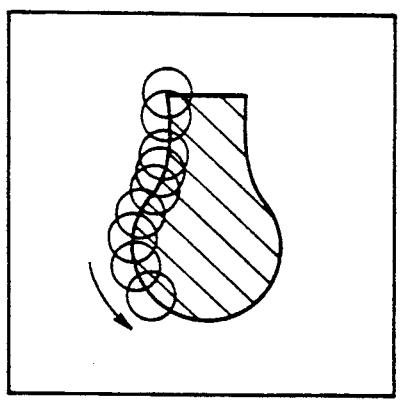

When the process steps S12 through S14 are completed for all of the clearer T-components, i.e., the color component images for Y, M and C-colors, the binary image being stored in the mask memory 7 has become a binary contour image expressing the contour CT within the image window N as a logical summation of the respective binary images obtained from the YMC color-component images. FIG. 9A schematically shows the binary contour image which is currently stored in the mask memory 7. Since the contour detection of the full contour has not been completed yet, only a part of the binary contour image is being stored in the mask memory 7.

The advantages of the process step for taking the logical summation between the binary images or logical images will be now described. One of them is based on the fact that a contour of a subject image sometimes appears on an original image in a form such that a part of the contour appears on one of color-component images while another part of the contour appears on another of the color-component images. If the contour is detected or extracted from only one of the color-component images, the detected contour may have a break or a rift therein. On the other hand, when the binary contour images, which are obtained from a plurality of color-component images, respectively, are combined with each other through the logical summation, respective parts of the contour are connected to each other, whereby a full contour can be detected without rifts.

The other advantage is that a part of the contour which is detected at one position of the image window N can be smoothly connected to another part of the contour which is detected at another position of the image window N.

In the next process step S16, the binary contour image is read out from the mask memory 7, to be delivered to the display controller 8. The display controller 8 converts the binary contour image into a semitransparent color image. Then, the contour image in a semitransparent color and the original image including the subject image I are displayed on the color display 9 while being adjusted in position. Since the contour image is in the semitransparent color, the positional relationship between the contour image and the subject image I can be easily found by observing the color display 9. At the time when the contour detection has been carried out for only one position of the image window N, the contour image being displayed with the subject image is a partial image of the contour CT.

The process then returns to the process step S5 while maintaining the display of the subject image and the detected part of the contour image. The operator moves to the stylus pen 11 on the digitizer 10, to thereby move the image window N along the contour CT. After the image window N has reached the position at which the next part of the contour CT appears in the image window N, the operator pushes the switch attached to the stylus pen 11. In response to the push operation, the CPU 1 starts to conduct the process steps S8 through S16 again, whereby the next part of the contour CT being located in the image window N is detected. The semitransparent color image of the detected part is added to the displayed image on the color display 9.

Figure 9B:
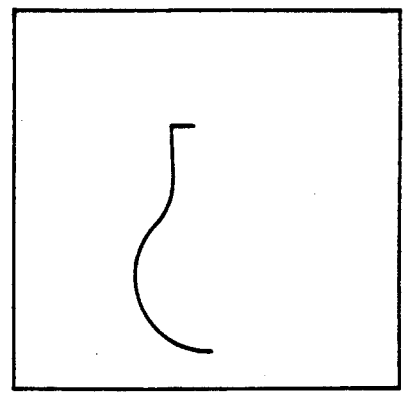
Figure 9C:
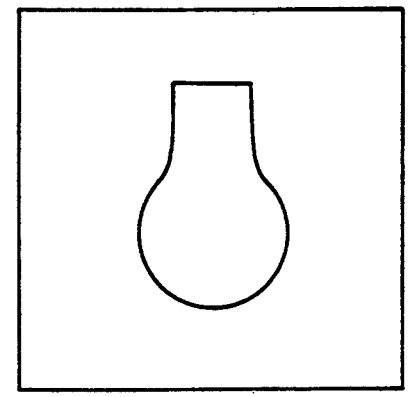

By repeating the above-indicated process while moving the image window N step by step along the contour CT as shown with arrows in FIG. 3A through FIG. 3D, the contour image in the mask memory 7 is grown step by step as shown in FIG. 9A through FIG. 9C. When the image window N has moved around the object image I, the contour image in the mask memory 7 becomes a closed loop as shown in FIG. 9C. The size or radius of the image window N may be changed in the sequence of the contour detection. The variance of radius in the respective circles shown in FIG. 3C corresponds to the change of the radius. When the radius is set at a relatively small value, the threshold level $E_{th}$ can be updated for each small pitch along the contour CT, whereby the binarization can be performed under optimum selection of the threshold level $E_{th}$, even if the density level on the contour CT varies complexly. On the other hand, when the radius is set at a relatively large value, the whole of the contour CT can be covered only through a smaller number of the designations using the stylus pen 11, whereby efficiency in the operation is increased. Preferably, the radius is varied according to curvatures of respective parts of the contour CT.

Figure 3C:
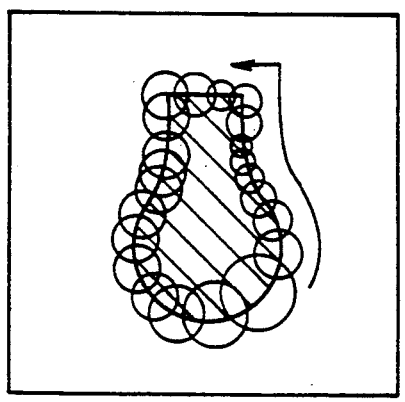

The areas defined by the image window N at respective positions, i.e., the circular areas in FIG. 3C, are connected in series without a gap thereamong, whereby a closed chain of the circular areas is formed schematically. This is because the whole of the contour CT can be detected by fully covering the contour CT with the circular areas.

When the detection or extraction of the contour image is completed, the operator inputs an end command through the keyboard 12 or the digitizer 10 in order to advise the completion of the detection to the CPU 1. Then, the CPU 1 starts to execute a subroutine for filling the inner region (or the outer region) of the contour CT with the logical level of "1". Any of the conventional methods can be employed in the process of filling a designated region on a memory. Through the filling process, an image data expressing a cut-out mask is obtained on the mask memory 7. The cut-out mask may be used for electronically cutting-out the object image from the original image. The cut-out mask may be produced by converting the contour into a sequence of vectors. Image masks other than the cut-out mask may be produced from the contour image on the mask memory 7.

C. Modifications of First Embodiment

The shape of the image window N may be a rectangle, a square or the like. The image window N may be moved in an arbitrary order on the contour as well as in a serial order along the contour. Duplicate designation for the same part of the contour is also permitted.

Since the mask memory 7 is so controlled as to accept a binary image through a logical summation, an additional line or curve can be written on the mask memory 7 with the stylus pen 11 and the digitizer 10. When the function for the logical summation is disabled, the whole or a part of the contour image being stored in the mask memory 7 can be deleted with the elements 10 and 11.

If it is previously found that the contour on one of these color component images is clear enough to be recognized as a closed loop, the number T designating how many color component images are to be subjected to the contour detection may be set at one, and only one color-component image is used for the contour detection.

When the original image is a monochrome image rather than a color image, only one of the image memories 5Y through 5K is employed for storing the monochrome image.

D. Overall Structure and Function of Second Embodiment

FIG. 10 is a block diagram showing an image processing system 200 according to a second preferred embodiment of the present invention, where elements the same as or corresponding to those of FIG. 1 are indicated with the same reference numerals. The image processing system 200 has a mask memory system 70 which includes first through fourth mask memories 71-74. The mask memories 71-74 may be referred to as a differential contour memory 71, a fat ring pattern memory 72, a work plane memory 73 and a primary ring pattern memory 74 according to their respective main functions, which will be described later. Although an operation program for the system 200 is previously stored in a ROM 2 similarly to the system 100 (FIG. 1), the respective contents of the operational program for the systems 100 and 200 are partially different from each other.

Furthermore, an image controller 8 has a function of controlling a color display 9 so that a cursor or target TG (FIG. 13A) is displayed on the color display 9 with or without first and second image windows (image windows) $N_1$ and $N_2$. The first and second image windows $N_1$ and $N_2$ are circles whose respective center points coincide with the position of the target TG designated through a digitizer 10 and a stylus pen 11. The other functions of the display controller 8 are similar to those of the first preferred embodiment. The respective constructions and functions of elements 1,3-6,12-14, are also same with those of the first preferred embodiment.

E. Operation of Second Embodiment

The operation of the system 200 will be described with reference to FIGS. 11 and 12A-12D, where FIGS. 12A-12B, 12C and 12D show the subroutines corresponding to the process steps S105, S106 and S109 in FIG. 11, respectively.

(E-1) Initialization and Display of Original Image

Referring to FIG. 11, the system 200 is initialized, and a preliminary processing is conducted through the process step S101 through S104, which correspond to the process step S1 through S4 in FIG. 2, respectively. All of the mask memories 71-74 are cleared in the process step S102.

Although only the original image is displayed on the color display 9 at the initial stage (the process step S103); the display control is so conducted in parallel with the following steps S105 through S109 that images respectively stored in the differential contour memory 71, the fat ring pattern memory 72, the work plane memory 73 and the image memory 5 are displayed on the color display 9 while being adjusted in position to overlap each other. The overlapped image being displayed is updated every 1/30 second, for example, according to the images currently being stored in these memories, whereby the displayed image follows changes of the stored images. The repetition in display is controlled by the image controller 8.

As will be described later in detail, the mask memories 71, 72 and 74 are operable to store a differential contour image (FIG. 13C), a fat ring pattern (FIG. 13E) and a primary ring pattern (FIG. 13D), respectively, and the work plane memory 73 serves as a work plane on which several images (FIGS. 14B-14E) are processed in order to obtain a contour image. Therefore, the differential contour image, the fat ring pattern, an image being processed and the original image are overlapped each other on the color display 9.

In order to avoid the situation where parts of these images relevant to the contour detection are hidden behind the other images, these images may be overlapped in accordance with a predetermined priority order in display. Preferably, the priority order is that of the differential contour image, the fat ring pattern, the image being processed on the main mask memory 73 serving as the work plane and the original image. Furthermore, the respective images in the mask memories 71, 73 and 72 may be displayed on the color display 9 in semitransparent colors.

(E-2) Generation of Differential Contour and Ring Patterns

Figure 12A:
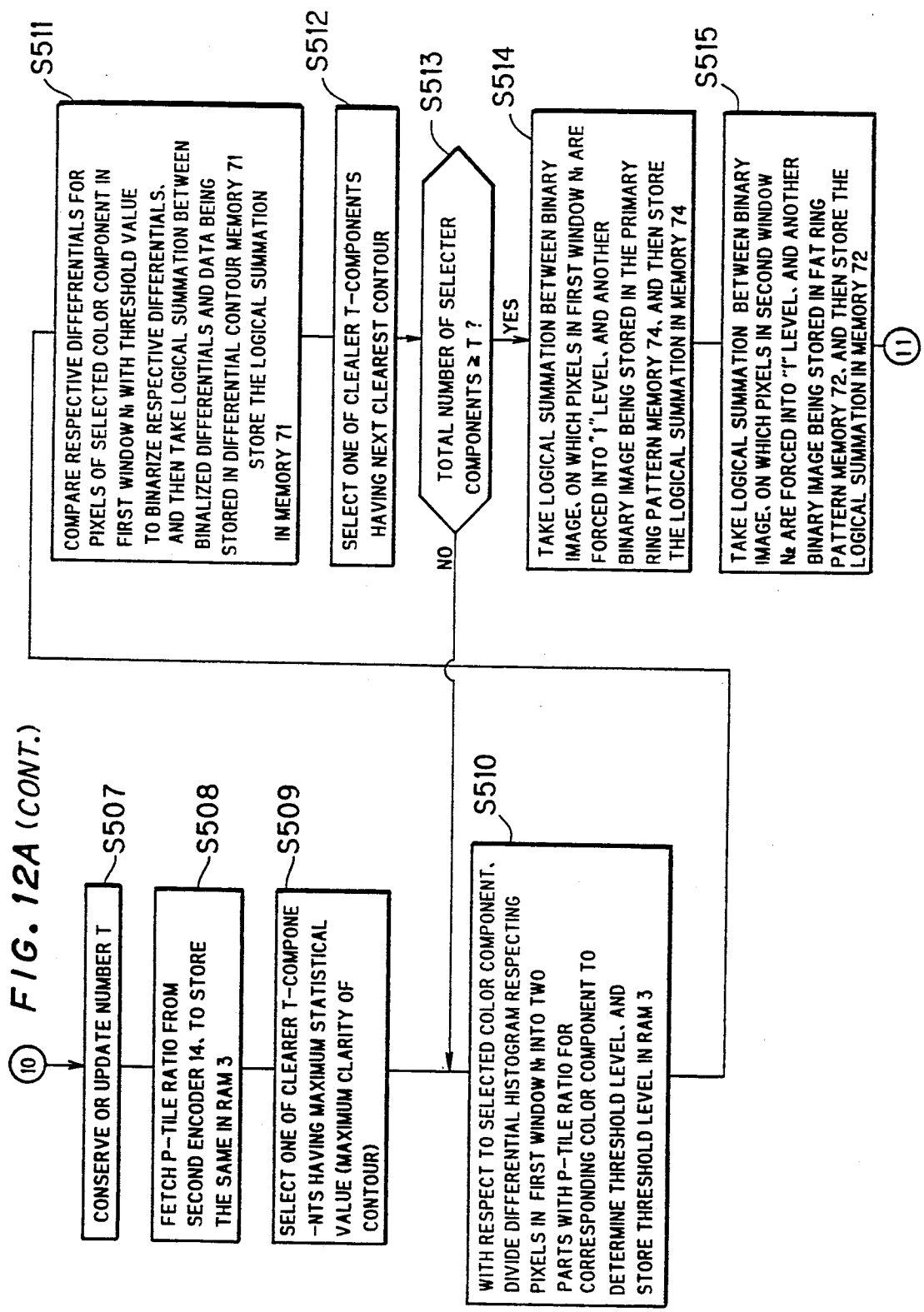
Figure 12C:
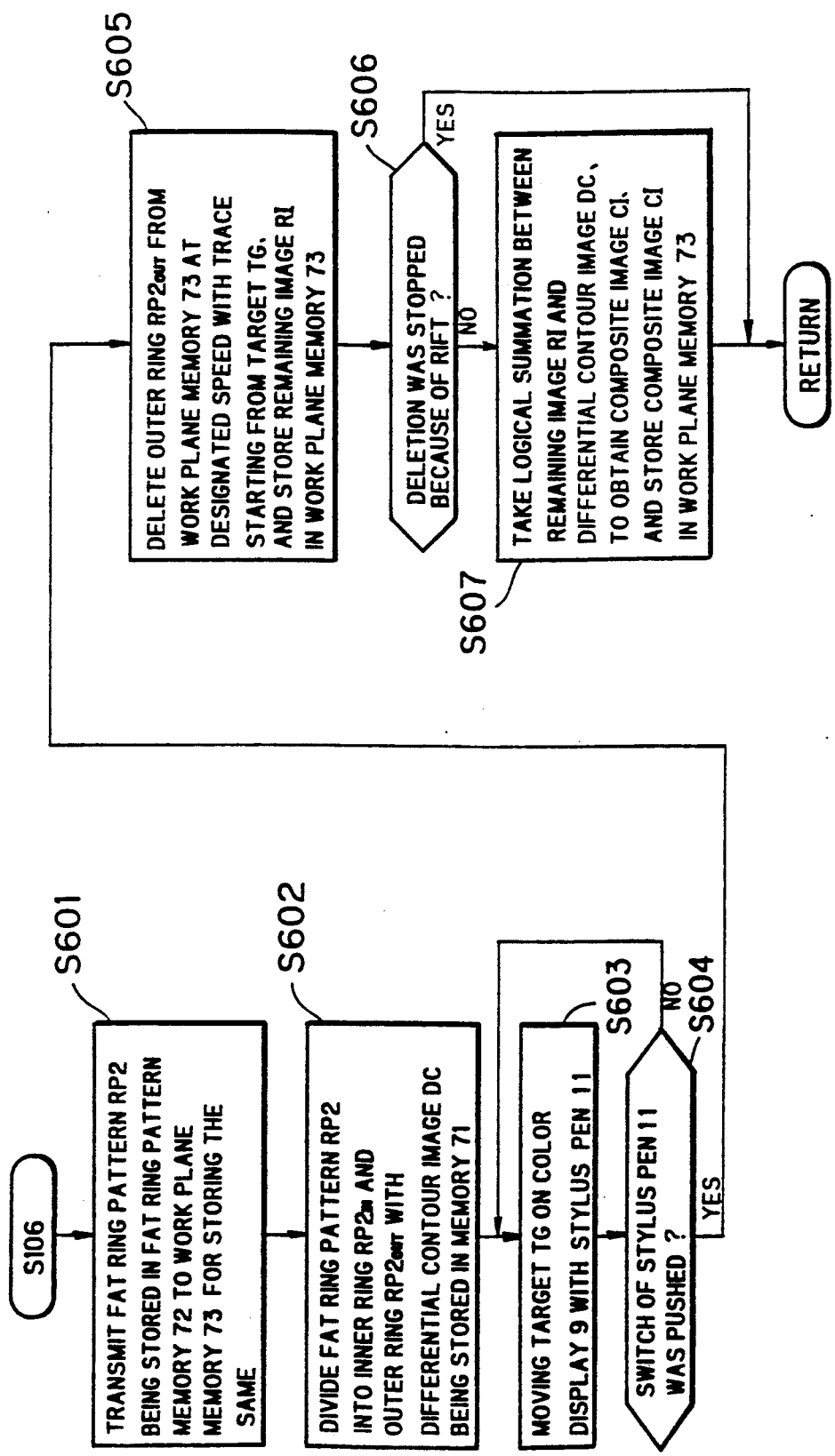

In the next process step 105, a differential contour image DC (FIG. 13C) and ring patterns RP1, RP2 (FIGS. 13D and 13E) are generated according to the subroutine shown in FIG. 12A. As understood by comparing FIG. 12A with FIG. 2, the process steps S501-S513 in FIG. 12A correspond to the process steps S5-S15 in FIG. 2 except for some points, whereby the process steps S501-S513 serve as a process of obtaining the differential contour image DC through substantially the same principle as with the first embodiment.

One of the differences between them is that the first and second image windows $N_1$ and $N_2$ (FIG. 13A), together with the target TG, are displayed on the color display 9. The radius of the first image window $N_1$ is designated with the first encoder 13, while the radius of the second image window $N_2$ is larger than that of the first image window $N_1$ by a predetermined small value which is one, two or three times the pixel size on the color display 9, for example. When the target TG is moved according to movement of the stylus pen 11, the image windows $N_1$ and $N_2$ follow the target TG on the color display 9, since the respective center points of the image windows $N_1$ and $N_2$ are always located at the target TG.

Anther difference is that the process steps S505 through S513 are conducted while regarding the first image window $N_1$ and the differential contour memory 71 as the image window N (FIGS. 3A-3C) and the mask memory 7 in the first preferred embodiment, respectively. Furthermore, the first image window $N_1$ is used for designating data to be stored in the primary ring pattern memory 74 as well as for designating respective partial areas for generating the differential contour. Therefore, when the process steps S501-S513 have been repeated for a current position of the first image window $N_1$, a part of the differential contour image existing in the first image window $N_1$ is obtained in the differential contour memory 71.

On the other hand, the process steps S514 and S515 which are not taken in the first preferred embodiment are provided in the subroutine of FIG. 12B. In the process step S514, a bit pattern in which all of pixels existing in the first image window $N_1$ are forced "1" is generated, and a logical summation for each pixel is taken between the bit pattern thus generated and an "old bit image" which is being stored in the primary ring pattern memory 74, to generate a "new bit image". Since the primary ring pattern memory 74 was cleared in the process step S102, the "old bit image" before the first execution of the process step S514 is a "white image" at which all of bits or pixels are in the logical level of "0", so that the "new bit image" which is obtained in the first execution of the process step S514 is just the image of a "black" circle corresponding to the inner region of the first image window $N_1$ at the current position thereof. The new "bit image" is then stored in the primary ring pattern memory 74 in place of the "old bit image". The process step S514 may be conducted through a read-modify-write operation for the primary ring pattern memory 74.

The process step S515 is similar to the process step S514 except for the difference where the second image window $N_2$ and the fat ring pattern memory 72 are employed in place of the image window $N_1$ and the memory 74, respectively. Thus, the image of another "black" circle corresponding to the inner region of the second image window $N_2$ is obtained in the fat ring pattern memory 72, when the first execution of the process step S515 has been just completed.

The subroutine shown in FIG. 12B is repeated while moving the target TG step by step along the contour CT until the whole of the contour CT is covered with a trace of the first image window $N_1$ (see FIG. 13B). The process of tracing the contour CT is conducted with the same procedure as for the first preferred embodiment. When the whole of the contour CT has been traced, the differential contour image DC (FIG. 13C) is obtained in the differential contour memory 71. At the same time, the primary ring pattern RP1 (FIG. 13D) and the fat ring pattern RP2 (FIG. 13E) are obtained in the primary and fat ring pattern memories 74 and 72, respectively, because the logical summation of the "black circles" for respective image window positions gives a ring pattern which expresses the trace of the corresponding image window. According to the fact that the radius of the second image window $N_2$ is larger than that of the first image window $N_1$, the width of the fat ring pattern RP2 is larger than that of the primary ring pattern RP1. It is to be noted that the fat ring pattern RP2 fully covers the primary ring pattern RP1, and the primary ring pattern RP1 fully covers the differential contour image DC, when these images are conceptionally overlapped on a common image plane while adjusting respective positions of these images to each other. These relationships will be used in the following process steps.

Since the subroutine of FIG. 12B does not work on the work plane memory 73, there is no image on the work plane memory 73 at the time when the subroutine of FIG. 12A has been just completed. If the differential contour image thus obtained has a defect because of detection errors or inferiority of the original image, the operator inputs a command for correction, which is detected in the process step S502, and then the operator corrects the defect through manual operation of the stylus pen 11 (the process step S503).

When a desired differential contour image is obtained, the operator inputs an end command for terminating the subroutine of FIG. 12A, and in response thereto, the process returns to the main routine (FIG. 11) through the process step S504.

(E-3) Generation of Composite Image

The next process step S106 (FIG. 11) is directed to generation of a composite image CI (FIG. 14E) through composition and partial deletion of images, details of which are described in FIG. 12C and FIGS. 14A-14E. FIG. 14A is the same illustration as FIG. 13C, and it is provided in order to clarify the relationship between the differential contour image DC and the other images shown in FIGS. 14B-14E. In the process step S601 (FIG. 12C), the fat ring pattern RP2 being stored in the fat ring pattern memory 72 is transmitted to the work plane memory 73 to be stored therein (FIG. 14B). Then, the fat ring pattern RP2 in the work plane memory 73 is partially deleted with the differential contour image DC (FIG. 14A), to thereby divide the fat ring pattern RP2 into an inner ring $RP2_{IN}$ and an outer ring $RP2_{OUT}$ (FIG. 14C). The partial deletion may be attained by taking "Exclusive OR" of the respective bit data in the differential contour image DC and the fat ring pattern RP2 for each pixel while adjusting their respective image planes to each other. The image including the inner ring $RP2_{IN}$ and the outer ring $RP2_{OUT}$ is stored in the work plane memory 73 (the process step S602) by replacing the fat ring pattern RP2 in the work plane memory 73 with the pair of rings $RP2_{IN}$ and $RP2_{OUT}$. As shown in FIG. 14C, the inner ring $RP2_{IN}$ and the outer ring $RP2_{OUT}$ are separated from each other by a gap $\overline{DC}$, which corresponds to a binary inversion or reverse of the differential contour image DC.

FIGS. 15A-15E are enlarged diagrams showing respective details of the partial areas PA1-PA5 of the images shown in FIGS. 14A-14E, respectively. At the place where the differential of the original image data is relatively small, pin holes PH (FIG. 15A) sometimes appear on the differential contour image DC, and consequently, "black" pin holes PH (FIG. 15C) exist in the gap $\overline{DC}$. These pin holes PH will be eliminated through the following process steps.

In the next process step S603, the operator moves the target TG to an arbitrary position on the outer ring $RP2_{OUT}$ with the stylus pen 11, while observing the target TG which is displayed on the color display 9. After the operator confirms that the target TG is on the outer ring $RP2_{OUT}$, the operator pushes the switch attached to the stylus pen 11, which is detected in the process step S604. Then, the CPU1 deletes the outer ring $RP2_{OUT}$ from the work plane memory 73 (FIG. 14D) through the routine where the deletion or erasure is started from the position of the target TG. Alternatively, the inner ring $RP2_{IN}$ may be deleted in place of the outer ring $RP2_{OUT}$.

Since the deletion process is equivalent to a process of filling all areas on the outer ring $RP2_{OUT}$ with the logical "0" or "white" pixels, the delection process can be attained by any method which is established for filling a given region on an image memory. For example, an arbitrary one of the following methods may be employed:

(1) Method of Filling Given Region by Elastic Bar

The method is disclosed by H. Lieberman in "How to Color in Coloring Book", SIGGRAPH '78, p. 111, (August, 1978). In this method, a given region is swept with "an elastic bar" in the direction perpendicular to the longitudinal direction of the elastic bar. The terminal points of the elastic bar are guided along the contour of the given region, and the length of the elastic bar is variable in response to the distance between the terminal points. When an elastic bar functions as an erasure bar, the image in the given region is serially deleted or erased as the elastic bar sweeps the given region.

(2) Method of Filling Given Region by Following Border of Given Region

In this method as modified for image delection, an erasure point is so moved as to follow the border of a given region, and then, the inner area of the given region is deleted through raster scanning. This method is disclosed by Y. Suenaga in "Collection of Papers", Vol. J68-D, No. 4, p465, April 1985, The Institute of Electronics and Communication of Japan.

(3) Basic Filling Method

According to the basic filling method, one of a plurality of points being interconnected in four-directional connectivity on a given image is selected as a seed point, and pixels being connected to the seed point are serially converted into those of a desired color. If the basic filling method is so modified as to convert the pixels on the given image into "white" pixels or pixels of the logical "0" level, this method can be employed for deleting the outer ring $RP2_{OUT}$.

The deletion speed of the outer ring $RP2_{OUT}$ is designated through the first encoder 13, and the deletion on the work plane memory 73 is performed at the designated speed. More particularly, the deletion routine is conducted under speed control with a waiting program (not shown) which is provided in the process step S605, and the waiting time by the waiting program is shortened or prolonged in proportion to the designated speed. As shown in FIGS. 14D and 15D, the image RI which remains after the deletion process consists of the inner ring $RP2_{IN}$ and the reversed pin holes $\overline{PH}$, and the remaining image RI is stored in the work planed memory 73 in place of the previous image shown in FIG. 14D.

Since the size of the second image window $N_2$ is so selected as to be larger than that of the first image window $N_1$ by one or more pixels, the width or thickness of the outer ring $RP2_{OUT}$ is not smaller than the pixel size even if the differential contour image DC is detected at an area near to the window edge of the first image window $N_1$. Therefore, the outer ring $RP2_{OUT}$ is not divided into a plurality of parts being unconnected with each other, and the delection of the outer ring $RP2_{OUT}$ can be attained by designating only one point from which the delection is started. If the second image window $N_2$ is not employed and the image shown in FIG. 14C is obtained on the basis of the primary ring pattern RP1 instead of the fat ring pattern RP2, the outer ring $RP2_{OUT}$ may be divided into unconnected parts so that two or more points must be designated as the starting points for the deletion. This is because the above-indicated methods for filling a given region (or for deleting an image on a given region) are adapted to a connected region, and they should be repeated for each single-connected region while designating respective starting points in the case where they are applied to a plurality of unconnected regions.

On the other hand, the outer ring $RP2_{OUT}$ and the inner ring $RP2_{IN}$ may be bridged with a chain of the reversed pin holes $\overline{PH}$, when the pin holes PH exist on one area at high concentration. In such a case, the deletion front penetrates into the inner ring $RP2_{IN}$ through the chain of the reversed pin holes $\overline{PH}$, whereby the inner ring $RP2_{IN}$ is also subjected to deletion against the operator's will. In order to avoid such undesirable deletion, the image on the work plane memory 73 whose parts are being deleted is displayed on the color display 9 in parallel with the deletion process. Preferably, the deletion speed is set at a low value so that the progress of the deletion can be carefully observed by the operator. The operator observes the image on the color display 9, and if it is found that the deletion front is penetrating into the inner ring $RP2_{IN}$ through the bridge or chain of the reversed pin holes $\overline{PH}$, the operator inputs a stop command for stopping the deletion process. The bridge or chain of the reversed pin holes $\overline{PH}$ corresponds to a rift of the gap $\overline{DC}$.

On the detecting the stop command (the process step S606), the CPU 1 stops the deletion process to return to the main routine. Then, the existance of the bridge or the rift is detected in the process step S107, and the image on the work plane memory 73 is fully deleted or cleared in the process step S108 to return to the process step S105.

In the returned process step S105, the p-tile ratio α may be changed in order to change the sensitivity in the detection of the differential contour image. The number T may be also changed for decreasing the pin holes PH in number. Alternatively, the image data for the area including the rift may be corrected through manual operation of the stylus pen 11. In the case where the deletion speed in the process step S106 is slow enough for the operator to know the position of the rift by finding the penetration path of the deletion front, the operator can easily correct the differential contour image DC to eliminate the rift.

On the other hand, when no rift exists and the deletion process is completed without interruption, a logical summation is taken between the remaining image RI (FIGS. 14D and 15D) being stored in the work plane memory 73 and the differential contour image DC (FIG. 14A) being stored in the differential contour memory 71, to thereby obtain the composite image CI (FIG. 14E) in the process step S607. After the composite image CI is stored in the work plane memory 73 in place of the remaining image RI, the process returns to the main routine.

It is to be noted in the process step S607 that the pin holes PH (FIG. 15A) in the differential contour image DI are fully compensated with the reversed pin holes $\overline{PH}$ (FIG. 15D) in the remaining image RI through the logical summation. Consequently, the composite image CI shown in FIGS. 14E and 15E consists of the inner ring $RP2_{IN}$ and a compensated differential contour CC having no pin holes as shown in FIG. 15E. In a logical expression, the composite contour image CT can be expressed as:

$$\begin{aligned} CI &= DC + RI \\ &= (CC + PH) + (RP2_{IN} + \overline{PH}) \\ &= CC + RP2_{IN} \end{aligned}$$

where the symbol "+" means a logical summation. The compensated differential contour CC represents the contour CT (FIG. 13A) of the subject image I with a width which is somewhat larger than that of the contour CT because of the differentiation which was performed for obtaining the differential contour image DC.

(E-4) Generation of Contour Image

After the composite image CI is obtained, the process proceeds to the next process step S109 (FIG. 11), details of which are described in FIG. 12D. In the first process step S901 of FIG. 12C, the composite image CI is thinned by a predetermined width that is one, two or three times the pixel size, for example. A thinned image (not shown) thus obtained is stored in the work plane memory 73 in place of the composite image CI. It is to be noted that the thinning process for the composite image CC is conducted for the outer side thereof, where the "outer side" is that of the image region surrounded by the contour.

One of the reasons why the composite image CI is subjected to the thinning operation is that the width of the compensated differential contour CC is larger than that of the contour CT and it is preferred to thin the compensated differential contour CC for obtaining a contour image faithful to the original contour CT. The other reason is based on a character of visual sensation in observation of a contour image. That is, a contour image can be recognized more clearly by observers in the case where the contour image is reproduced at somewhat inner positions from the original contour, as compared with the case where the image contour is reproduced just on the positions of the original contour.

Under the circumstances, the thinning process is so conducted that only the outer edge portion of the composite image CI, i.e., only the portion corresponding to the compensated differential contour CC, is thinned while the inner edge portion is conserved. More particularly, pixels existing on the edges of the composite image CI are detected through four-directional or eight-directional connectivity algorithms that are being well known in the art. For each of the detected edge pixels, the corresponding pixel on the primary ring pattern memory 74 is referred to. It is to be noted that the fat ring pattern RP2 (FIG. 13E) is wider than the primary ring pattern RP1 (FIG. 13D) in both of the inner and outer edges thereof, because of the condition where the size of the second image window $N_2$ is larger than that of the first image window N1, and therefore, the inner edge of the composite image CI (FIG. 14E) is always out of the primary ring pattern RP1 while the outer edge of the composite image CI is always within the same. Consequently, if the pixel on the primary ring pattern memory 74 which corresponds to the detected edge pixel of the composite image CI has the logical value of "1", it is recognized that the detected edge pixel is a pixel existing in the outer edge portion of the composite image CI. On the other hand, if the corresponding pixel on the primary ring pattern memory 74 has the logical level of "0", the detected edge pixel is a pixel existing on the inner edge portion. Only the detected edge pixels existing on the outer edge portion are subjected to the thinning process, whereby only the composite image CI is thinned only from the outer contour side or the pheripheral side thereof.

In the next process step S903 (FIG. 12D), outer and inner edge images EI1, EI2 (FIG. 16A) of the thinned image are extracted from the thinned image being stored in the work plane memory 73. The extraction process may be carried out through four-directional or eight-directional connectivity algorithms which are established for detecting edges of a binary image. The edge images EI1 and EI2 thus obtained are stored in the work plane memory 73 in place of the thinned image TI.

The fat ring pattern RP2 being stored in the fat ring pattern memory 72 is also subjected to the routine for extracting outer and inner edge images XD1, XD2 thereof (FIG. 16B) at the process step S903. The extraction routine may be conducted through the four-directional or eight-directional connectivity algorithms indicated above, and the extracted edge images XD1 and X2 are stored in the fat ring pattern memory 72 in place of the fat ring pattern RP2.

Then, the first edge pair consisting of the edge images EI1 and EI2 is compared with the second edge pair consisting of the edge images XD1 and XD2, whereby a part of the first pair which overlaps with the second pair is cleared or forced into the logical level of "0" on the work plane memory 73 (the process step S904). Since both of the inner edge images EI2 and XD2 were generated at common positions, i.e., at the inner edge of the fat ring pattern RP2, they overlap with each other and the inner edge image EI2 is cleared on the work plane memory 73. On the other hand, the outer edge images EI1 and XD1 were generated at different positions, and they do not overlap with each other. Accordingly, only the outer edge image EI1 remains after the partial clearance using the edge images XD1 and XD2. The outer edge image EI1 which remains on the work plane memory 73 is just a contour image CI (FIG. 16C) according to the present invention. The broken lines in FIG. 16C show the positions of the fat ring pattern RP2 for reference, but it is not in actual existance in the work plane memory 73.

When the contour image CI is used for producing a mask, e.g., a cut-out mask or a photomask, the inner region of the contour image CI is filled with the logical level of "1". The mask data thus obtained is delivered to an image recorder such as a scanner in the form of binary image data, whereby a mask image is recorded on a recording medium such as a photosensitive film.

According to the second preferred embodiment, pin holes in the differential contour image are compensated, and a contour image without pin holes can be obtained. Furthermore, even if a differential contour image has a rift, the rift is easily found through observation of the image data processing with a color display 9. As a result, the situation is prevented, as shown in FIG. 17, where a contour image CI has pin holes PH, and a contour line CL is split into two or more branches even where the contour image CI is thinned through a contour image thinning process. Therefore, a laborious work for compensating for the pin holes PH through a manual operation can be avoided.

F. Modification of Second Embodiment

The process steps S902 through S904 may be replaced with a contour following method as follows: In the contour following method, the data indicating the starting point which was designated in the process steps S603 and S604 (FIG. 12B) is conserved. After the process step S901 is completed, a raster scanning is started on the work plane memory 74 from the starting point. When the raster scanning reaches the edge of the composite image CI at a reaching point, a process of following the edge is started from the reaching point. The following process is continued by serially detecting pixels which have a designated connectivity, and is continued until the composited image CI is rounded along the edge, while specifying respective coordinates of pixels on the edge. A series of the coordinates or chained codes expressing the edge pixels are employed as data indicating the contour image CI, which is useful for producing a cut-out mask by cutting a peel-off film with a cutting-plotter. Such a peel-off film is itself well know in the field of photographic processing.

Since the starting point which is designated in the process step S603 and S604 is located on the outer ring $RP2_{OUT}$, the raster scanning is always started from the outer peripheral position of the composite image CI, whereby only the coordinates of pixels on the outer edge image EI1 are obtained.

In the process of generating the differential contour image DC, the image windows $N_1$ and $N_2$ may be moved only along a part of the contour CT. In this case, the remaining parts of the contour CT are detected with another method in which respective absolute levels of pixels are compared with a threshold value so that the pixels on the contour are discriminated from other pixels.

Although the present invention has been described and illustrated in detail, it is clearly understood that the same is by way of illustration and example only and is not to be taken by way of limitation; the spirit and scope of the present invention being limited only by the terms of the appended claims.

What is claimed is:

1. A method of generating contour image data expressing a contour of a subject image that is included in an original image, said original image being expressed by a plurality of pixels having respective gradation levels, the method comprising the steps of:
   (a) displaying said original image on a display means;
   (b) designating an area on said original image while observing said original image on said display means so that said contour belongs to said area;
   (c) calculating respective spatial differentials of gradation levels with respect to pixels being included in said area;
   (d) determining a threshold level for said respective spatial differentials, the step (d) including the substeps:
      (d-1-1) generating a differential histogram which expresses a distribution of said respective spatial differentials over each of several partial areas of said area;
      (d-1-2) designating criteria for dividing said differential histogram into two parts; and
      (d-1-3) finding a boundary level at which said differential histogram is divided into said two parts, said threshold level being determined by said boundary level;
   (e) comparing said respective spatial differentials with said threshold level, to thereby classify said pixels being included in said area into a first group of pixels having differentials larger than said threshold level and a second group of pixels having differentials smaller than said threshold level;
   (f) extracting pixels belonging to said first group from said pixels being included in said area, to thereby specify extracted pixels; and
   (g) generating contour image data expressing a contour image on which said extracted pixels represent said contour.

2. A method of claim 1, where the step (b) includes the steps of:
   (b-1) providing an image window at a position which is so designated on said original image being displayed that a part of said contour appears in said image window; and
   (b-2) repeating designation of said position while changing said position along said contour so that said image window moves along said contour, said area being defined by a trace of said image window.

3. A method of claim 2, wherein the step (c) includes the steps of:
   (c-1) specifying a partial area of said original image which appears through said window;
   (c-2) calculating respective spatial differentials of gradation levels with respect to pixels belonging to said partial area; and
   (c-3) repeating the steps (c-1) and (c-2) every time said position is designated in the step (b-2), whereby said area is covered with a plurality of partial areas each of which is specified in step (c-1).

4. A method of claim 3, wherein the step includes the steps of:
   (d-1) determining said threshold level for said respective spatial differentials obtained in the step (c-2); and
   (d-2) repeating the step (d-1) every time the step (c-2) is repeated;
   the step (e) includes a first repetition cycle for obtaining said first and second groups for each partial area;
   the step of (f) includes a second repetition for obtaining said extracted pixels for each partial area; and
   the step of (g) includes the step of: (g-1) connecting said extracted pixels for said plurality of said partial areas with each other in an image memory, to thereby generate said contour image data in said image memory.

5. The method of claim 1, wherein:
   said original image is a color image being separated into color-component images whose number is M, where M is an integer larger than one;
   said method further comprises the steps of:
   (h) designating an integer T which satisfies the condition $2 \leq T \leq M$;
   (i) selecting one of said color-component images as a selected component according to degree of clarity of said contour appearing on said color-component images;
   (j) conducting the steps (d) through (f) for said selected component, to obtain said extracted pixels from said selected component; and
   (k) repeating the steps (i) and (j) while updating said selected component T-times within said color-component images, to obtain T-sets of said extracted pixels; and
   the step (g) includes the step of:
   (g-1) logically summing data associated with said T-sets of said extracted pixels with each other in an image memory, to thereby generate said contour image data in said image memory.

6. A method of claim 5, wherein the step (e) includes the steps of:
   (e-1) giving a first logical level to pixels belonging to said first group, whereby said extracted pixels are provided with said first logical level; and (e-2) giving a second logical level to pixels belonging to said second group; and the step (g-1) includes the steps of:

(g-1-1) with respect to each selected component, defining a logical image on which pixels corresponding to said extracted pixels have said first logical level; and (g-1-2) taking logical summation between respective logical images obtained in the step (g-1-1), to thereby obtain said contour image data.

7. The method of claim 1, wherein:

said original image is a color image which is being separated into a plurality of color-component images; and said method further comprises the steps of:

(h) selecting one of said plurality of said color-component images having a highest clarity of said contour appearing on said plurality of color-component images; and (i) conducting the steps (d) through (f) for said one of said plurality of said color-component images to obtain said extracted pixels thereof.

8. A method of generating contour image data expressing a contour of a subject image that is included in an original image, said original image being expressed by a plurality of pixels having respective gradation levels, the method comprising the steps of:

(a) a displaying said original image on a display means;

(b) designating an area on said original image while observing said original image on said display means so that said contour belongs to said area, the step (b) including the substeps:

(b-1) providing an image window at a position which is so designated on said original image being displayed that a part of said contour appears in said image window; and (b-2) repeating the designation of said position while changing said position along said contour so that said image window moves along said contour, said area being defined by a trace of said image window;

(c) calculating respective spatial differentials of gradation levels with respect to pixels being included in said area, the step (c) including the substeps:

(c-1) specifying a partial area of said original image which appears through said window, (c-2) calculating respective spatial differentials of gradation levels with respect to pixels belonging to said partial area, and (c-3) repeating the steps (c-1) and (c-2) every time said position is designated in step (b-2), whereby said area is covered with a plurality of partial areas each of which is specified in step (c-1);

(d) determining a threshold level for said respective spatial differentials, the step (d) including the substeps:

(d-1) determining said threshold level for said respective spatial differentials obtained in step (c-2), and (d-2) repeating the step (d-1) every time the step (c-2) is repeated, the step (d-1) including the substeps:

(d-1-1) generating a differential histogram which expresses a distribution of said respective spatial differential, (d-1-2) designating a criteria for dividing said differential histogram into two parts, and (d-1-3) finding a boundary level at which said differential histogram is divided into said two parts, said threshold level being determined by said boundary level;

(e) comparing said respective spatial differentials with said threshold level, to thereby classify said pixels being included in said area into a first group of pixels having differentials larger than said threshold level and a second group of pixels having differentials smaller than said threshold level, the step (e) including a first repetition cycle for obtaining said first and second groups for each partial area;

(f) extracting pixels belonging to said first group from said pixels being included in said area, to thereby specify extracted pixels, the step (f) including a second repetition for obtaining said extracted pixels for each partial area; and (g) generating contour image data expressing a contour image on which said extracted pixels represent said contour, the step (g) including the substep:

(g-1) connecting said extracted pixels for said plurality of said partial areas with each other in an image memory, to thereby generate said contour image data in said image memory.

9. A method of claim 8, wherein said criteria is expressed by a variable percentile ratio for said differential histogram.

10. A method of claim 9, wherein the step (e) is attained through the step of:

(E-1) binarizing said respective spatial differentials with respect to said pixels included in said area, whereby a first logical level is given to pixels belonging to said first group and a second logical level is given to pixels belonging to said second group, said extracted pixels being provided with said first logical level.

11. A method of claim 10, wherein the step (g-1) includes the steps of:

(g-1-1) with respect to each partial area, defining a logical image on which pixels corresponding to said extracted pixels have said first logical level; and (g-1-2) taking logical summation between respective logical images obtained in the step (g-1-1), to thereby obtain said contour image data.

12. A method of generating contour image data expressing a contour of a subject image which is included in an original image, said original image being expressed by a plurality of pixels having respective gradation levels, said method of comprising the steps of:

(a) displaying said original image on a display means;

(b) designating an area on said original image while observing said original image on said display means so that said contour belongs to said area, (c) calculating respective spatial differentials of gradation levels with respect to pixels being included in said area, (d) determining a threshold level for said respective spatial differentials, (e) comparing said respective spatial differentials with said threshold level, to thereby classify said pixels being included in said area into a first group of pixels having differentials larger than said threshold level and a second group of pixels having differentials smaller than said threshold level, step (e) including the substeps:

(e-1) giving a first logical level to pixels belonging to said first group, whereby said extracted pixels are provided with said first logical level; and (e-2) giving a second logical level to pixels belonging to said second group;

(f) extracting pixels belonging to said first group from said pixels being included in said area, to thereby specify extracted pixels;

(g) generating contour image data expressing a contour image on which said extracted pixels represent said contour;

said original image being a color image and being separated into color-component images whose number is M, where M is an integer larger than one, said method further including:

(h) designating an integer T which satisfies the condition $2 \leq T \leq M$, (i) selecting one of said color-component images as a selected component according to degree of clarity of said contour appearing on said color component images, the step of (i) including the substeps:

(i-1) for each color-component image, calculating a statistical value which expresses a degree of statistical split in distribution of said respective spatial differentials, (i-2) comparing respective statistical values obtained in the step (i-1) with each other, to thereby find a maximum value within said respective statistical values, and (i-3) selecting one of said color-component images corresponding to said maximum value, to thereby specify said selected component, (j) conducting the steps (d) through (f) for said selected component, to obtain said extracted pixels from said selected component, and (k) repeating the steps (i) through (j) while updating said selected component T-times within said color component images, to obtain T-sets of said extracted pixels, the step (k) includes the step of:

(k-1) repeating the steps (i-2) and (i-3) T-times, where a color component image having been selected in a previous repetition of step (i-3) is excluded from selection in following repetition of step (i-3);

the step (g) including the substeps:

(g-1) logically summing data associated with said T-sets of said extracted pixels with each other in an image memory, to thereby generate said contour image data in said image memory;

(g-1-1) with respect to each selected component, defining a logical image on which pixels corresponding to said extracted pixels have said first logical level, and (g-1-2) taking logical summation between respective logical images obtained in the step (g-1-1), to thereby obtain said contour image.

13. A method of claim 12, wherein:

said area is covered with a plurality of partial areas each of which is designated with an image window provided on said original image being displayed; and the steps (h) through (k) are conducted for each partial area, whereby said integer T is variable for each partial area.

14. A method of claim 13, further comprising the steps of:

(l) designating initial size of said image window; and (m) changing size of said image window for a designated partial area.

15. A method of claim 14, wherein:

the step (m) includes the step of:

(m) changing the size of said image window according to curvature of said contour on said designated partial area.

16. A method of generating contour image data expressing a contour of a subject image that is included in an original image, said original image being expressed by a plurality of pixels having respective gradation levels, the method comprising the steps of:

(a) calculating respective spatial differentials of gradation levels with respect to pixels on said original image;

(b) comparing said respective spatial differentials with a threshold level to binarize said pixels on said original image, whereby a differential contour image expressing said contour is obtained;

(c) generating a ring image covering said differential contour image with a margin;

(d) dividing said ring image into an inner ring image and an outer ring image with said differential contour image, said inner and outer ring images being separated from each other by a gap corresponding to said differential contour image;

(e) deleting one of said inner and outer ring images, to thereby generate a remaining ring image;

(f) combining said remaining ring image with said differential contour image to generate a composite image in the shape of a ring;

(g) generating a loop image which expresses a loop extending along an edge of said composite image; and (h) generating said contour image data in accordance with said loop image.

17. A method of claim 16, wherein the step (g) includes the step of:

(g-1) thinning said composite image by deleting one of inner and outer edge portions of said composite image, to obtain a thinned image having the shape of a ring;

(g-2) generating a first edge image which expresses inner and outer edges of said thinned image;

(g-3) generating a second edge image which expresses inner and outer edges of said ring image; and (g-4) deleting a part of said first edge image at which said second edge image overlaps with said first edge image, to thereby obtain said loop image.

18. A method of claim 17, wherein said method further comprises the steps of:

(i) displaying said original image on a display means;

(j) designing a point at a neighborhood of said contour included in said original image being displayed;

(k) generating first and second image windows around said point on said display means, in which said second image window has a size larger than a size of said first image window and said first image window is surrounded by said second window; and (l) moving said point along said contour so that said first and second image windows follow movement of said point, whereby first and second rings are defined by respective traces of said first and second image windows, respectively;

said pixels on said original image being subjected to the step (a) are pixels belonging to said first ring; and said ring image which is generated in the step (c) is an image expressing said second ring.

19. A method of claim 18, wherein the step (g-1) includes the steps of:

(g-1-1) detecting said inner and outer edge portions of said composite image; and (g-1-2) deleting one of said inner and outer edge portions which overlaps with said first image, to obtain said thinned image.

20. A method of claim 19, wherein the step (1) includes the steps of:

(1-1) pausing movement of said point at a position where a part of said contour appears in said first window;

(1-2) conducting the steps (a) and (b) for pixels within said first image window being paused at said position by the step (1-1), whereby a part of said differential contour image is obtained;

(1-3) repeating the steps (1-1) and (1-2) while moving said point along said contour; whereby respective parts of said differential contour image are obtained; and (1-4) connecting said respective parts of said differential contour image with each other, to thereby obtain the whole of said differential contour image.

21. A method of claim 20, further comprising the step of:

(m) displaying said differential contour image and said ring image on said display means while overlapping said differential contour image and said ring image with said original image on said display means.

22. A method of claim 21, wherein said differential contour image and said ring image are displayed on said display means in semitransparent colors.

23. A method of claim 22, wherein:

said differential contour image has pin holes; said reverse image of said differential contour image has reversed pin holes; and said reversed pin holes are compensated with said pin holes through the step (f).

24. A method of claim 16, wherein the step (g) includes the steps of:

(g-1) thinning said composite image by deleting one of inner and outer edge portions of said composite image, to obtain a thinned image having the shape of a ring; and (g-2) tracing an edge of said thinned image which is not deleted in the step (g-1), to obtain said loop image.

* * * * *